United States Patent
Jacob (Yaakov) et al.

(10) Patent No.: US 10,831,702 B2
(45) Date of Patent: Nov. 10, 2020

(54) EFFICIENT UTILIZATION OF SYSTOLIC ARRAYS IN COMPUTATIONAL PROCESSING

(71) Applicant: Ceva D.S.P. Ltd., Herzlia Pituach (IL)

(72) Inventors: Jeffrey Allan (Alon) Jacob (Yaakov), Raanana (IL); Roni M. Sadeh, Kfar Saba (IL)

(73) Assignee: Ceva D.S.P. Ltd., Herzlia Pituach (IL)

( * ) Notice: Subject to any disclaimer, the term of this patent is extended or adjusted under 35 U.S.C. 154(b) by 124 days.

(21) Appl. No.: 16/241,085

(22) Filed: Jan. 7, 2019

(65) Prior Publication Data

US 2020/0097442 A1     Mar. 26, 2020

Related U.S. Application Data

(60) Provisional application No. 62/733,812, filed on Sep. 20, 2018.

(51) Int. Cl.
    *G06F 9/30*         (2018.01)
    *G06F 15/80*      (2006.01)

(52) U.S. Cl.
    CPC ...... *G06F 15/8046* (2013.01); *G06F 9/30032* (2013.01)

(58) Field of Classification Search
    None
    See application file for complete search history.

(56) References Cited

U.S. PATENT DOCUMENTS

| | | | |
|---|---|---|---|
| 6,466,692 B1 | 10/2002 | Washizawa | |
| 6,728,862 B1 | 4/2004 | Wilson | |
| 9,524,450 B2 | 12/2016 | Ravindran et al. | |
| 2012/0191967 A1* | 7/2012 | Lin | H04N 19/61 713/100 |
| 2016/0342893 A1* | 11/2016 | Ross | G06N 3/063 |
| 2017/0103318 A1 | 4/2017 | Ross | |

(Continued)

FOREIGN PATENT DOCUMENTS

CN        107358576        11/2017

OTHER PUBLICATIONS

Hrabovsky J et al: "Systolic-based 2D convolver for CNN in FPGA" 2017, 15th International Conference on Emerging Elearning Technologies and Applications (ICETA), IEEE, Oct. 26, 2017, pp. 1-7.

(Continued)

*Primary Examiner* — John M Lindlof
(74) *Attorney, Agent, or Firm* — Pearl Cohen Zedek Latzer Baratz LLP

(57) ABSTRACT

A system and method for performing computational processing by a systolic array. The systolic array including an array of processing elements (PEs) arranged in rows and columns; logic to perform a horizontal shift operation, wherein the horizontal shift operation is performed across the entire systolic array; and logic to mark columns of PEs as enabled or disabled, wherein the systolic array is horizontally divided into horizontal groups, and wherein when performing the horizontal shift operation, valid data that crosses from a first column of PEs of a first horizontal group to a second column of PEs of a second horizontal group is invalidated, wherein the first horizontal group is adjacent to the second horizontal group.

20 Claims, 15 Drawing Sheets

(56) References Cited

U.S. PATENT DOCUMENTS

2017/0132769 A1     5/2017  Barron et al.
2018/0046906 A1*    2/2018  Dally ................... G06F 7/523
2019/0305800 A1*   10/2019  Fan .................. H03M 13/1525

OTHER PUBLICATIONS

Extended European Search Report for European Patent Application No. 19198114.1, dated Mar. 26, 2020.

* cited by examiner

Fig. 5

EFFICIENT UTILIZATION OF SYSTOLIC ARRAYS IN COMPUTATIONAL PROCESSING

CROSS-REFERENCE TO RELATED APPLICATIONS

This Application claims the benefit of U.S. Provisional Application Ser. No. 62/733,812, filed Sep. 20, 2018, which is hereby incorporated by reference in its entirety.

FIELD OF THE INVENTION

The present invention relates generally to the field of systolic arrays for performing neural network calculations, and more particularly, to efficient utilization of processing elements (PEs) in systolic arrays.

BACKGROUND

A systolic array may refer to an array of processing units or PEs, typically including multipliers-accumulators (MACs). Each MAC may compute a partial result as a function of the data received from its neighbors, accumulate and/or store the result and pass it downstream to a neighboring MAC. Systolic arrays may be used for accelerating deep-learning neural networks calculations, and specifically convolutional neural networks (CNNs) calculations. Systolic arrays may be used by any computer application requiring efficient CNN calculations such as automotive, autonomous drones, surveillance cameras, mobile devices, Internet of Things (IoT) devices and high-end devices with embedded neural network processing.

SUMMARY

According to embodiments of the present invention, a systolic array for computational processing may include an array of processing elements (PEs) arranged in rows and columns; logic to perform a horizontal shift operation, wherein the horizontal shift operation may be performed across the entire systolic array; and logic to mark columns of PEs as enabled or disabled, wherein the systolic array may be horizontally divided into horizontal groups, and wherein when performing the horizontal shift operation, valid data that crosses from a first column of PEs of a first horizontal group to a second column of PEs of a second horizontal group may be invalidated, wherein the first horizontal group is adjacent to the second horizontal group. According to some embodiments invalid data that crosses from the first horizontal group to the second horizontal group may be validated.

According to embodiments of the present invention, data may be validated by enabling the PEs the data is shifted to, and invalidated by disabling the PEs the data is shifted to.

According to embodiments of the present invention, the systolic array may be configured to perform a two-dimensional filter in the first horizontal group by, for example:
a. loading a plurality of input maps into the first horizontal group, wherein a respective data element of each input map is loaded into an active register and a shadow register of a single PE;
b. validating the columns of the first horizontal group;
c. multiplying each valid data element of each input map by a respective weight and accumulating the results in each of the enabled PEs;
d. performing the horizontal shift operation by loading data from the active register of PEs at an adjacent column;
e. repeating operations c and d for a row of filter taps;
f. performing a vertical shift operation by loading data from the shadow register of PEs at a row underneath;
g. repeating operations c-e; and
h. repeating operation f and g for remaining rows of the filter.

According to embodiments of the present invention, systolic array may be configured to perform a filter with pads by: loading row data of an input map (IM) into a row of PEs of the systolic array, wherein the loaded row data may be shifted in a first direction according to the number of pads so that a first portion of the row data may be loaded to the first horizontal group and a second portion of the row data may be loaded to the second horizontal group, wherein the portion of the row data that is loaded to the first horizontal group is disabled; in each cycle of the filtering, horizontally shifting the row data from the first horizontal group to the second horizontal group; multiplying the data elements stored in the row of the PEs by corresponding weights; and accumulating the results of the multiplications.

According to embodiments of the present invention, the systolic array may include: controllable data edge indications associated with the columns, for indicating a horizontal position of edges between the horizontal groups; and controllable column valid indications associated with the columns, for enabling and disabling the columns, wherein disabling and enabling the data that crosses from the first horizontal group to the second horizontal group may be performed according to a value of an associated column valid indication and associated data edge indication.

According to embodiments of the present invention, the column valid indication may include a ColumnValid bit, wherein a first value of the ColumnValid bit may indicate that data in a respective column is valid, and a second value of the ColumnValid bit may indicate that data in the respective column is not valid; the data edge indication may include a DataEdge bit, wherein a first value of the DataEdge bit may indicate an edge, and a second value of the DataEdge bit may indicate no edge; and wherein value of the ColumnValid bit of a column after performing horizontal shift may be determined based on a logical operation between associated DataEdge bit and ColumnValid bit.

According to embodiments of the present invention, the logical operation may be an XOR operation between the associated ColumnValid bit and DataEdge bit.

According to embodiments of the present invention, each PE may include at least one multiplier-accumulator (MAC).

According to embodiments of the present invention, the array of PEs may be a two-dimensional array.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 5 describes a basic convolution operation, helpful in demonstrating embodiments of the invention;

Figure 1:
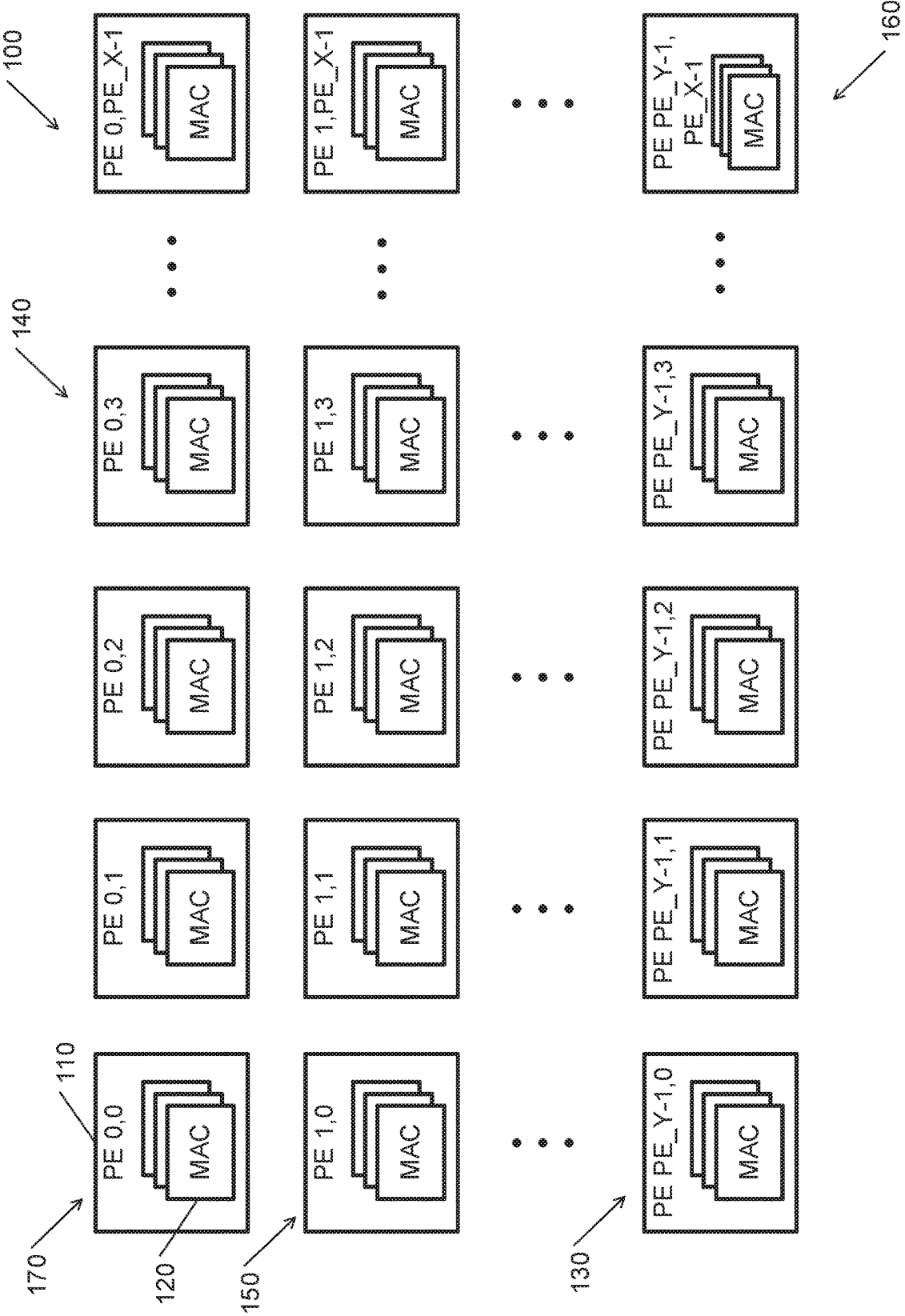
FIG. 1 is a schematic illustration of a systolic array according to embodiments of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well known features may be omitted or simplified in order not to obscure the present invention.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices.

Reference is made to FIG. 1, which is a schematic illustration of a systolic array 100 according to embodiments of the invention. Systolic array 100 may be a two-dimensional systolic array of processing elements (PEs) 110 arranged in rows 150 and columns 140. Systolic array 100 may have a predetermined number of PE rows 150 (marked in FIG. 1 as PE_Y), and a predetermined number of PE columns 140 (marked in FIG. 1 as PE_X). PEs 140 in systolic array 100 may be preprogramed at a design phase (e.g., before reduction to a physical device and fabrication) to be in different arrangements of PE rows 150 and PE columns 140 according to the use-case. Thus, PE_X and PE_Y values may be designed for optimal performance for a certain use-case. For example, in a first use-case PE_Y may equal 4 and PE_X may equal 256 and in a second use-case PE_Y may equal 8 and PE_X may equal 64 etc. Each PE 110 may include a configurable number of fused MACs 120. Each MAC in a fused MAC 120 may multiply a data element by a weight. In some embodiments, all MACs in a fused MAC 120 may multiply a different data element by the same weight. In some embodiments each MAC in a fused MAC 120 may produce a single result, thus each PE may produce multiple results simultaneously. In some embodiments, the products of all fused MACs 120 of a PE 110 may be added together to a single result. In some embodiments systolic array 100 may include 4 rows 150 and 256 columns 140 of PEs 110, where each PE 110 may include 16 fused MACs 120. In this configuration systolic array 100 may include a total of 16K MACs, e.g., of 8-bit precision. Other numbers of components, and other dimensions, may be used. Row PE_Y-1 may be referred to herein as bottom row 130 of systolic array 100, with row PE_Y-2 above it, and so on.

The terms denoting location, such as vertical, horizontal, top, bottom, upwards, downwards, left, right etc., may refer to or be relative to the logical direction of data flow. Similarly, rows and columns of systolic array 100 may be relative to a direction of data flow. For example, data may be loaded into bottom row 130 of systolic array 100 (e.g., into PEs 110 of bottom row 130). In addition terms denoting location, are typically used for the convenience of the designer or programmer, and the actual location in the physical computing device of units may not follow these location designations. For example, a row of computing units as described herein may not physically be in a row, when located on a chip, and a unit to the left of another unit may not actually be to the left of the unit, on the chip. However, the arrangements of elements as discussed affects the relationship of the elements to each other and how data is shifted: data is "moved" as described herein, and is moved among units that are logically, if not physically, arranged as described herein.

Moving data from one row to another may be referred to herein as vertical shifting. Vertical shifting may include shifting upwards and shifting downwards. Row 170 may be referred to herein as the top row of systolic array 100. Shifting or moving data from one row to a row above it e.g., from row PE_Y-1 to row PE_Y-2, may be referred to herein as shifting or moving upwards, while shifting or moving data from a row to a row underneath it, e.g., from row PE_Y-2 to row PE_Y-1, may be referred to herein as shifting or moving downwards, to a PE at the same column in the row below. As noted, data may be loaded into bottom row 130 of systolic array 100; internal to systolic array 100, this data may be shifted (vertically) upwards to the other rows.

Column PE_X-1 may be referred to herein as the rightmost column 160 of systolic array 100, with row PE_X-2 to the left of it, and so on. Shifting data from one column to a column next to it may be referred to herein as horizontal shift. Shifting data from one column to a column to the left of it, e.g., from column PE_X-1 to column PE_X-2, may be referred to herein as shift left. The terms shift left and horizontal shift may be used interchangeably herein for shifting data in a single direction between PEs in the same row. Typically, a rightmost PE may store a least significant bit (LSB) or bits and a leftmost PE may store a most significant bit (MSB) or bits. It should be readily understood that this definition is not limiting and that systolic array 100 may support horizontal shifting in any logical direction. For clarity of the disclosure, horizontal shifting may be described herein with an example of shift left. However, this is not limiting, and similar logic may be implemented for right shift. Systolic array 100 may include connectivity and logic, as presented in FIG. 4, to support performing shift upwards, shift downwards or horizontal shift at each cycle, where the same operation is performed across the entire systolic array 100, e.g. for each PE 110 in array 100. For example, when shifting left, each data element in each PE 110 of systolic array 100 is shifted or moved left, to the PE 110 to the left of the PE 110 at the same row (PEs at the rightmost column of systolic array 100 may be nulled and data from PEs at the leftmost column may be discarded). This configuration enables performing large scale CNN calculations (e.g., filtering) efficiently, with relatively simple connectivity and associated logic.

Figure 2:
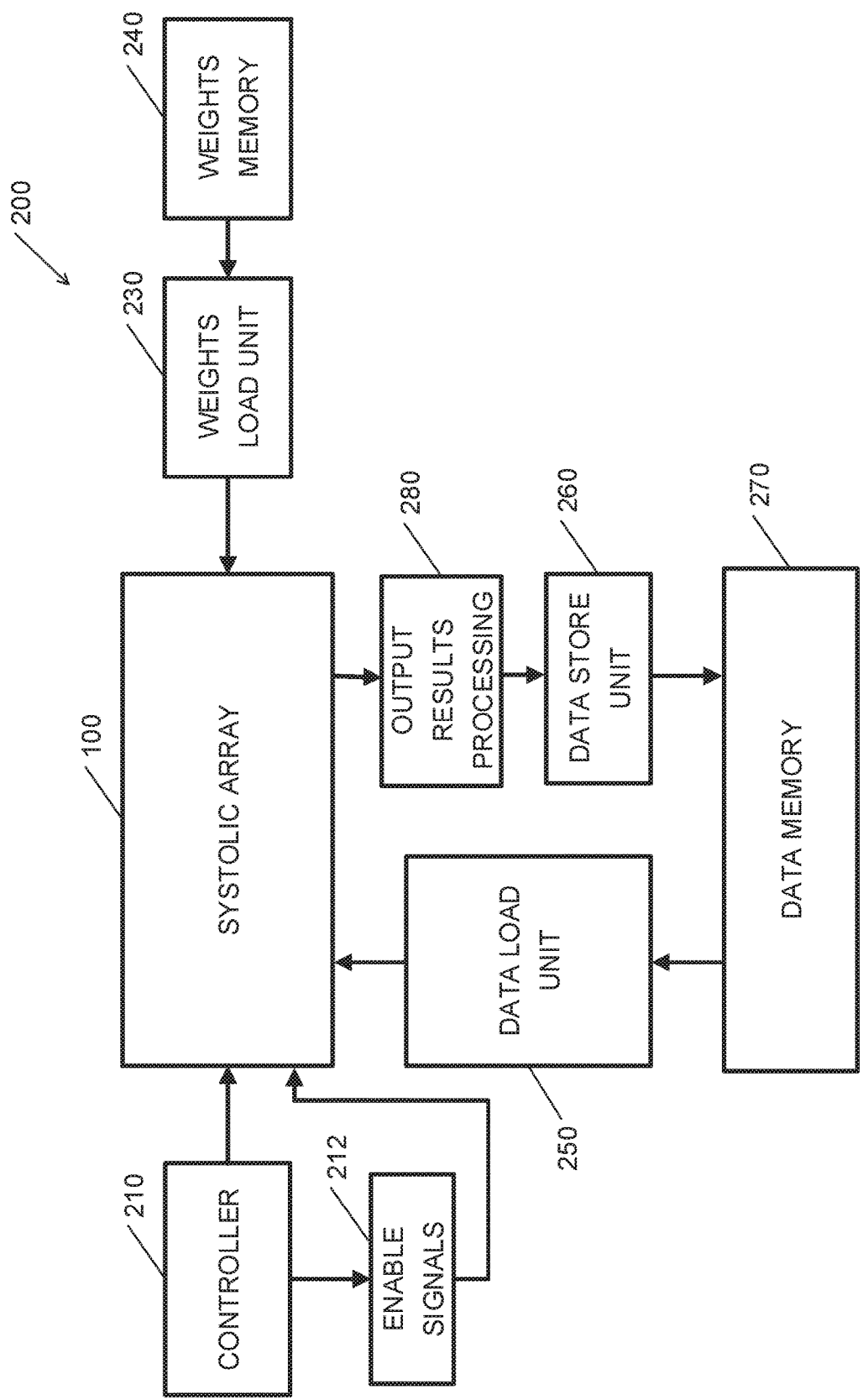
FIG. 2 is a schematic illustration of a system including a systolic array according to embodiments of the invention.

Reference is made to FIG. 2, which is a schematic illustration of a computer system 200 including systolic array 100, according to embodiments of the invention. In some embodiments system 200 may be implemented as a system on a chip (SoC). Systolic array 100 may be connected to a data load unit (DLU) 250, which may fetch input maps (IMs) from data memory (DMEM) 270, and may load the IMs into systolic array 100. An IM may refer to a two-dimensional array of data elements (input data elements or features). Data elements, including data elements of IMs, output maps (OMs), weights, filter taps, and any intermediate results, may refer to any type of data, in any required precision, including for example, 8-bit data, 16-bit data, 32-bit data, etc., in any applicable format, e.g., binary, signed, unsigned, floating point, etc. IMs may be loaded into data shadow registers (e.g., data shadow registers 420 shown in FIG. 4) that are internal to each PE 110. In some embodiments, a total of 4 KB of data may be loaded into systolic array 100 in a single cycle; other amounts of data may be used. As used herein, cycle may refer to a sequence of operations performed on data elements that end with storing the results in internal registers, including for example retrieving data from data memory 270 and storing the fetched data elements in data shadow registers 420, or performing a single stage of a calculation and storing the results in partial sum (PSUM) resisters (e.g., PSUM registers 480 shown in FIG. 4). A length of a single cycle may be measured in clock cycles (for example, one or more clock cycles of system 200). In some embodiments, fully utilizing the loading capabilities, e.g., loading 4 KB data, requires loading data for all of the 16 fused MACs 120 across the bottom row 130 of all the 256 columns of systolic array 100. Data may be loaded into bottom row 130 of systolic array 100; internal to systolic array 100, this data may be shifted upwards to the other rows. Systolic array 100 may also be connected to weight load unit (WLU) 230, which may fetch weights from weights memory (WMEM) 240, and broadcast the weights to systolic array 100. In some embodiments, up to 512 weights may be driven to systolic array 100 in each cycle.

Systolic array 100 may perform convolutions using the input data and the weights. During the processing, the results may be accumulated in PSUM registers 480 that may be for example 32 bits wide. Other sizes of PSUM registers 480 may be used. When a batch of convolutions is completed, systolic array 100 may output the convolved OMs to an output results processing block 280, where the post-processing including activation and pooling may be performed, e.g., at a rate of 128 PSUM registers 480 per cycle. As used herein, an OM may refer to an array of data elements that are the result of a layer of IMs that have been processed and output by systolic array 100. Activation may relate to performing a non-linear function on the convolution output, and pooling may relate to reducing the size of the OM by selecting the maximum value or an average value of a group of output elements. The results of the activation and pooling may be stored in DMEM 270 by data store unit (DSU) 260, which, in some embodiments, may store for example up to 256 elements per cycle. The data may be output only from bottom row 130 of systolic array 100; internal to systolic array 100, output data may be shifted downwards toward bottom row 130.

Figure 3:
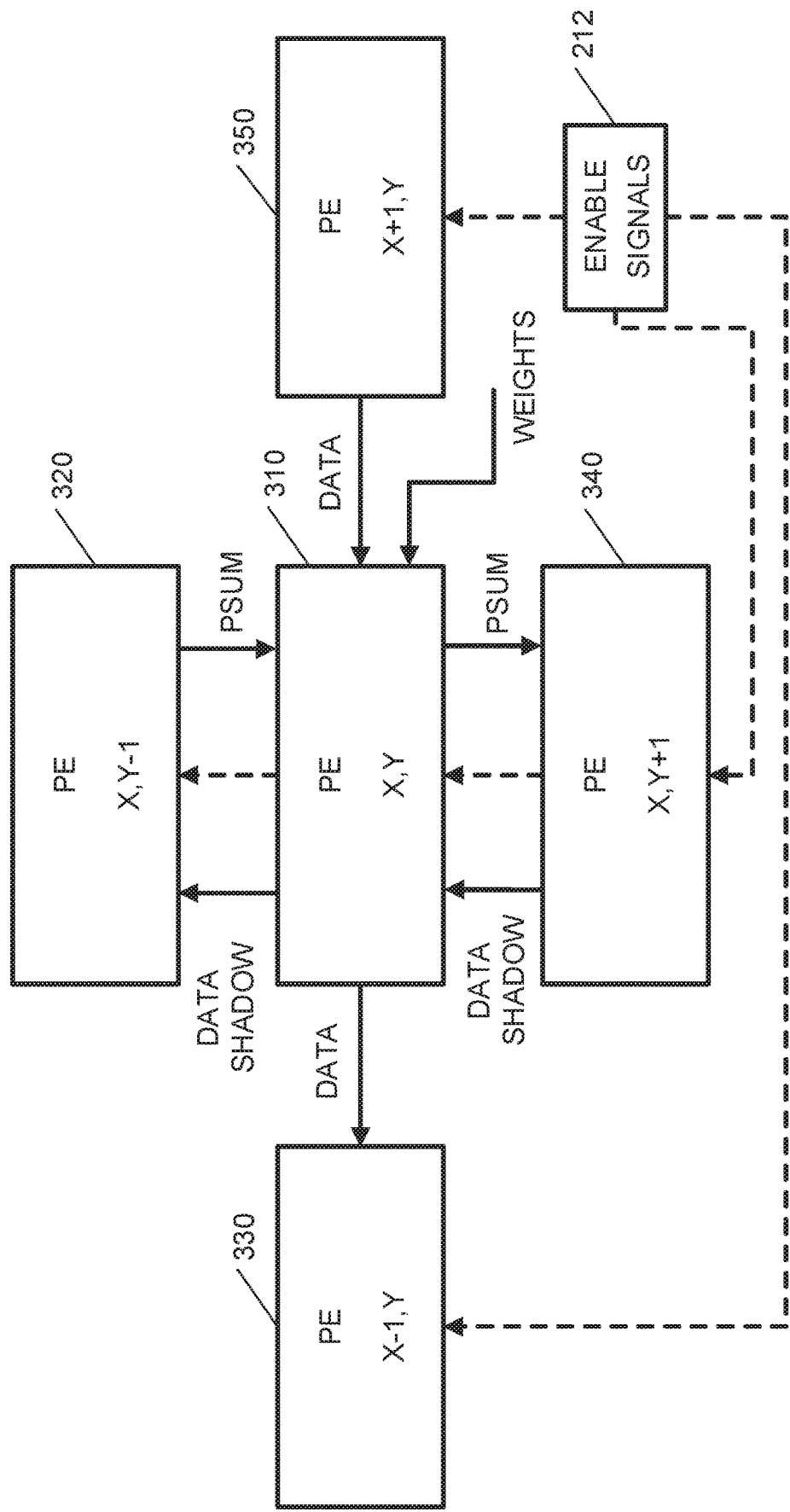
FIG. 3 is a schematic illustration of connectivity of PEs within a systolic array, according to embodiments of the invention.

Systolic array 100 may include connectivity and logic, as presented in FIGS. 2 and 3, to support marking of columns of PEs as enabled or disabled. For example, controller 210 may perform cycle-by-cycle control of the operation of systolic array 100 and may generate an enable/disable signals 212, e.g., a clock enable signal, for each column 140 of PEs 110. Controller 210 may generate control signals for controlling the operation of systolic array as disclosed herein. For example, controller 210 may generate shift left and swap signals, "DataEdge" bits and "ColumnValid" (other specific names may be used) bits, and enable signals.

Reference is made to FIG. 3, which is a schematic illustration of connectivity of PEs 110 within systolic array 100, according to embodiments of the invention. PEs 110 may be connected to immediate or adjacent neighbors (e.g. with no intermediate PEs between them). For example, exemplary PE 310 may be connected to PE 320 at a row above it, to PE 340 at a row underneath it, to PE 350 at a column to the right of it and to PE 330 at a column to the left of it. PEs 310 320 and 330 may all be in the same column and PEs 310, 330 and 350 may all be in the same row. PEs 110 may retrieve data for each of its internal fused MACs 120 from PEs at a row underneath them for transferring load data between rows, and from PEs at a column adjacent to them (e.g., to the right of them) for shifting the data horizontally between PEs. According to some embodiments, PEs 110 may retrieve data from shadow registers (e.g., shadow registers 420 shown in FIG. 4) of PEs at a row underneath them for shifting data vertically, and from active registers (e.g., active registers 410 shown in FIG. 4) of PEs at a column adjacent to them for shifting the data horizontally columns. For example, PE 310 may retrieve data from the shadow register of PE 340 for transferring load data or from the active register of PE 350 for shifting data horizontally. Other configuration may apply, e.g., PEs 110 may retrieve data from active registers of PEs at a row underneath them for shifting data vertically, and from shadow registers of PEs at a column adjacent to them for shifting the data horizontally between PEs.

The weights for fused MACs 120 may be distributed to a column 140 of PEs 110, e.g., PEs 110 at column 140 may use the same weights. The accumulated results (stored in PSUM registers 480) may be transferred from each PE 110 to the PE directly underneath it (e.g., in the same column, at a row underneath it). For example, the accumulated results stored in PSUM registers 480 of PE 310 may be transferred to PE 340.

Enable signals 212 may be provided to columns 140 of PEs for enabling and disabling PEs of columns as may be required. For example, the enable signals may be clock enabling signals that may stop or enable the clock, and thus the operation, of PEs 110 in a column. Other configurations may be used.

Figure 4:
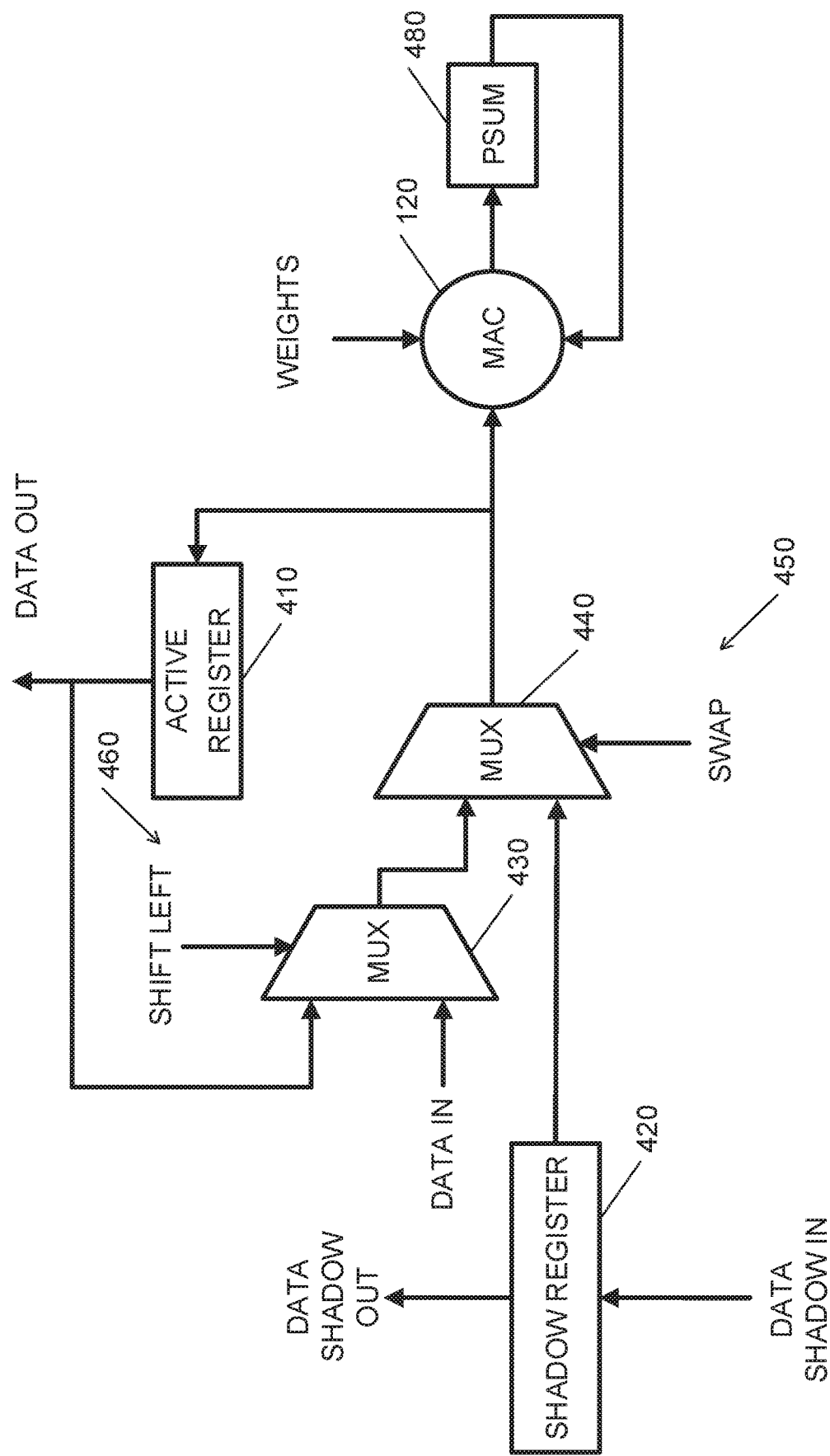
FIG. 4 is a schematic illustration of shift left and swap signals of PEs, according to embodiments of the invention.

Reference is made to FIG. 4, which is a schematic illustration a PEs 110, according to embodiments of the invention. According to embodiments of the invention, data that is loaded into systolic array 100 is not operated on immediately; instead, data may first be loaded into shadow registers 420. Each PE 110 may include a single shadow register 420 for each of its fused MACs 120. Shadow registers 420 of a PEs 110 at a certain row may be connected to shadow registers 420 of PEs 110 in the same column at a row above and to the data shadow registers 420 of PEs 110 in the same column at a row below, e.g., via data shadow in and data shadow out interconnections. Active registers 410 of PEs 110 at a certain column may be connected to active registers 410 of PEs 110 in the same rw at an adjacent column, e.g., via data in and data out interconnections.

Data may be loaded into active register 410 and the fused MACs by asserting the swap signal. After data elements are multiplied by the appropriate weights and the results of the multiplications are summed and stored in PSUM registers 480, data for all fused MACs 120 may be shifted horizontally (e.g., left) in systolic array 100. Horizontal shift may be done by asserting the shift left signal 460, which may cause PE 110 to replace its data (e.g., data stored in active register 410 of that PE 110) with data from its immediate neighbor, e.g., right neighbor. After a complete row of a filter operation is completed, e.g., after results of all multiplications of data and filter taps or weights required for a single filter row have been performed and a final result is ready in the PSUM register 480, a swap signal 450 may be asserted. Asserting swap signal 450 may switch to the next data row by activating the data in the shadow registers 420. Swap signal 450 may also cause the ColumnValid bits to be re-initialized as disclosed herein.

According to embodiments of the invention, calculating a CNN using systolic array 100 may include performing a plurality of convolution operations on a plurality of IMs (e.g., a layer of IMs) to produce a single OM (e.g., a layer of OMs). In some embodiments, at least some of the convolution operations may be performed on a plurality of IMs in parallel. A plurality of convolution operations that are performed on a plurality of IMs and produce a single layer of OMs may be referred to herein as a convolution layer. For calculating a convolution layer the PE array may be partitioned into horizontal groups, where each horizontal group calculates a different OM or group of OMs. The horizontal groups may be referred to herein as active groups. Performing convolutions may include performing filtering operations.

Calculating a single element in a single OM may be performed by summing multiplications of each element in a filter matrix by corresponding elements in all IMs in an IM layer. For example, element {0,0} of the filter may be multiplied by element {0,0} of each IM in a layer of IMs, element {0,1} of the filter may be multiplied by element {0,1} of each IM in the layer of IMs, and so on until element {n−1,n−1}, and the results of the multiplications may be summed to obtain a single element in the OM. This operation may be repeated for each element in the IM and its corresponding filter taps, and the output may be a single element in the OM. For the next element in the OM, the filter matrix may move to the next set of elements in the IM layer, and so on for the entire IM layer, e.g. for each element in the IM layer. When moving to the next OM, the IM may remain the same, but the filter matrix may change. In some embodiments, the filter matrix may move on the IM in two, three, or four steps horizontally, vertically, or both. These jumps are also called strides.

Figure 5:
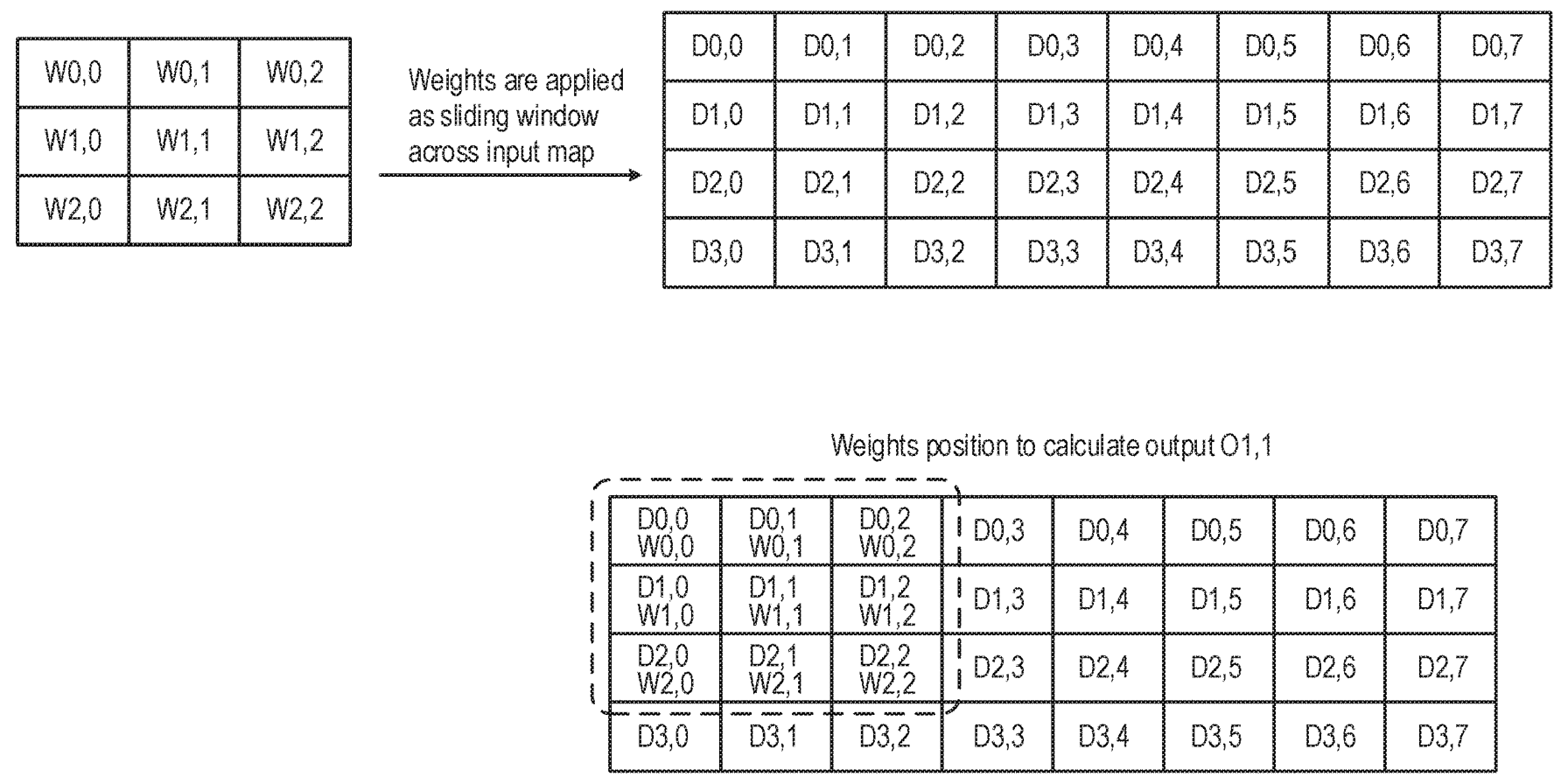

Reference is now made to FIG. 5 describing a basic convolution operation helpful in demonstrating embodiments of the invention. Basically, a convolution operation, or a filter operation, may be performed by loading input data in the form of IMs (or an IM layer) into systolic array 100, and then shifting the IMs vertically and horizontally within the array while applying different weights. FIG. 5 demonstrates using a 3×3 filter that is applied to a miniaturized systolic array 100 of 4×8 PEs 110.

The output element {1,1} of the OM may be calculated for the 3×3 filter for example as follows:

$$\text{Output}\{1, 1\} = \sum_{n \in IM\ layer} D_n 0, 0 * W0, 0 + \sum_{n \in IM\ layer} D_n 0,$$
$$1 * W0, 1 + \sum_{n \in IM\ layer} D_n 0, 2 * W0, 2 + \sum_{n \in IM\ layer} D_n 1, 0 * W1,$$
$$0 + \sum_{n \in IM\ layer} D_n 1, 1 * W1, 1 + \sum_{n \in IM\ layer} D_n 1, 2 * W1, 2 + \sum_{n \in IM\ layer} D_n 2,$$
$$0 * W2, 0 + \sum_{n \in IM\ layer} D_n 2, 1 * W2, 1 + \sum_{n \in IM\ layer} D_n 2, 2 * W2, 2$$

According to embodiments of the invention, each output element is calculated by a single PE 110 over a plurality of cycles. In each cycle a single data element of each IM is multiplied by the same respective weight (e.g., within a cycle the same weight is used to multiply a data element of each of different IMs in a single horizontal group). For example, in a first cycle D0,0 of each IM may be multiplied by W0,0, in a subsequent cycle D0,1 of each IM may be multiplied by W0,1 and so on. The results of the multiplications may be summed in a PSUM register 480. Because only a single weight of the filter is applied to a single EP 110 in each cycle, this filter takes nine cycles to complete, e.g., a cycle for each multiplication. During subsequent cycles, the data may be shifted as the next weights in the filter are applied. In this approach, the filter accumulation (in PSUMs 480) for each OM element is stationary, while the data shifts and the weights are broadcast across systolic array 100.

Figure 6A:
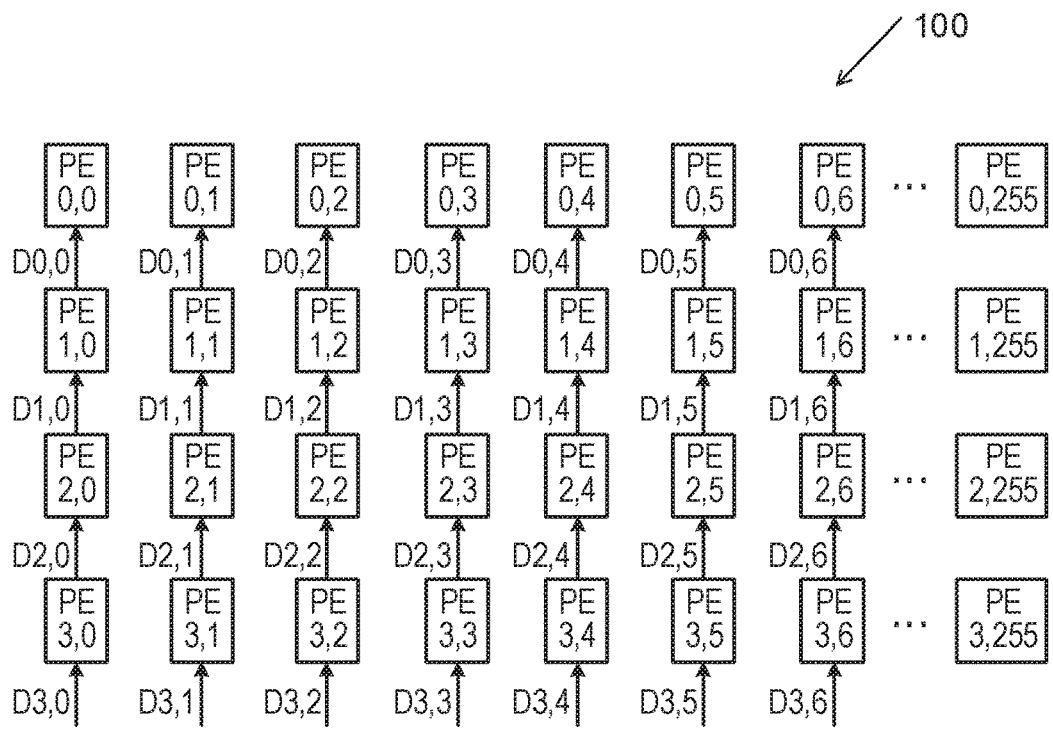
FIG. 6A demonstrates multiplying data elements stored in PEs of a systolic array by weight W0,0 after the data is loaded into the systolic array, helpful in demonstrating embodiments of the invention.

Reference is now made to FIGS. 6A-6I demonstrating cycles of the 3*3 filter operation helpful in demonstrating embodiments of the invention. The filter may be performed in a single horizontal group 750, while other horizontal groups 750 may perform similar filter, only with different IMs and different values of filter taps. FIG. 6A demonstrates multiplying data elements stored in PEs 110 of a horizontal group 750 of systolic array 100 by weight W0,0 (e.g., each data element in PEs 110 of horizontal group 750 is multiplied by weight W0,0) after the data (e.g., an IM) is loaded into horizontal group 750. Each PE 110 in horizontal group 750 may calculate a different element in the OM, and PE0,0 may accumulate the results for output element {1,1}. In the first cycle PE0,0 operates on D0,0 of each IM. Thus, after this cycle PSUM register 480 stores the result of the first multiplication of the filter:

$$PSUM = \sum_{n \in IM\ layer} D_n 0,0 * W0,0$$

Figure 6B:
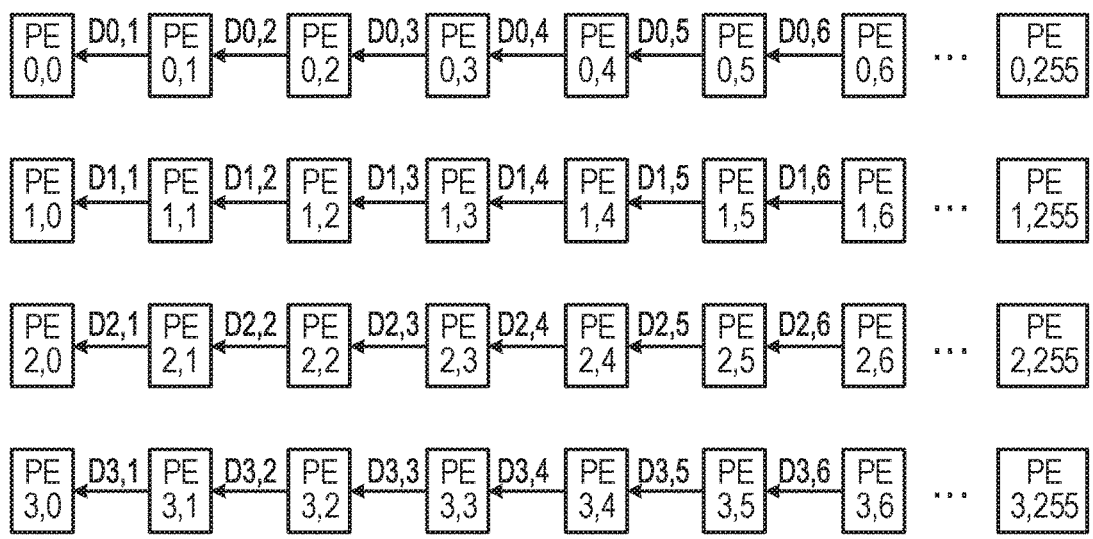
FIG. 6B demonstrates multiplying data elements stored in PEs of the systolic array by weight W0,1, helpful in demonstrating embodiments of the invention.

FIG. 6B demonstrates multiplying data elements stored in PEs 110 of horizontal group 750 by weight W0,1. In this cycle, the data is shifted left (e.g., from an active register 410 of an adjunct PE 110 using shift left signal) so PE0,0 operates on D0,1 of each IM. The PSUM register 480 in PE0,0 accumulates its previous result with the multiplication of D0,1*W0,1. Thus, after this cycle, PSUM register 480 stores the result of the first two multiplications of the filter:

$$PSUM = \sum_{n \in IM\ layer} D_n 0,0 * W0,0 + \sum_{n \in IM\ layer} D_n 0, 1 * W0,1$$

Figure 6C:
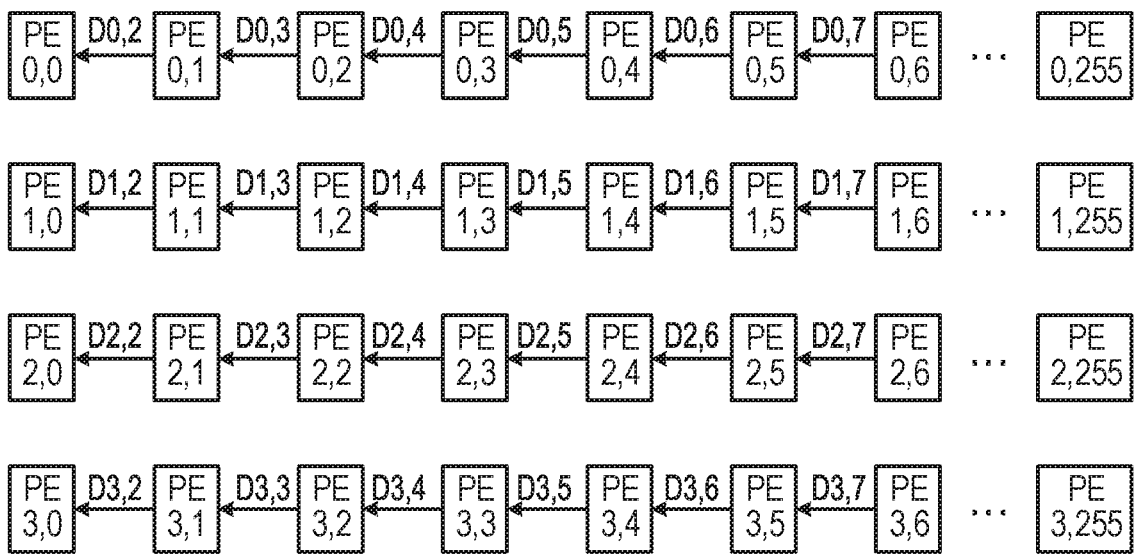
FIG. 6C demonstrates multiplying data elements stored in PEs of the systolic array by weight W0,2, helpful in demonstrating embodiments of the invention.

FIG. 6C demonstrates multiplying data elements stored in PEs 110 of horizontal group 750 by weight W0,2. In this cycle, the data is shifted left so PE0,0 operates on D0,2 of each IM. The PSUM register 480 in PE0,0 accumulates its previous result with the multiplication of D0,2*W0,2. Thus, after this cycle, PSUM register 480 stores the result of the first three multiplications of the filter:

$$PSUM = \sum_{n \in IM\ layer} D_n 0,0 * W0,0 + \sum_{n \in IM\ layer} D_n 0, 1 * W0, 1 + \sum_{n \in IM\ layer} D_n 0, 2 * W0, 2$$

Figure 6D:
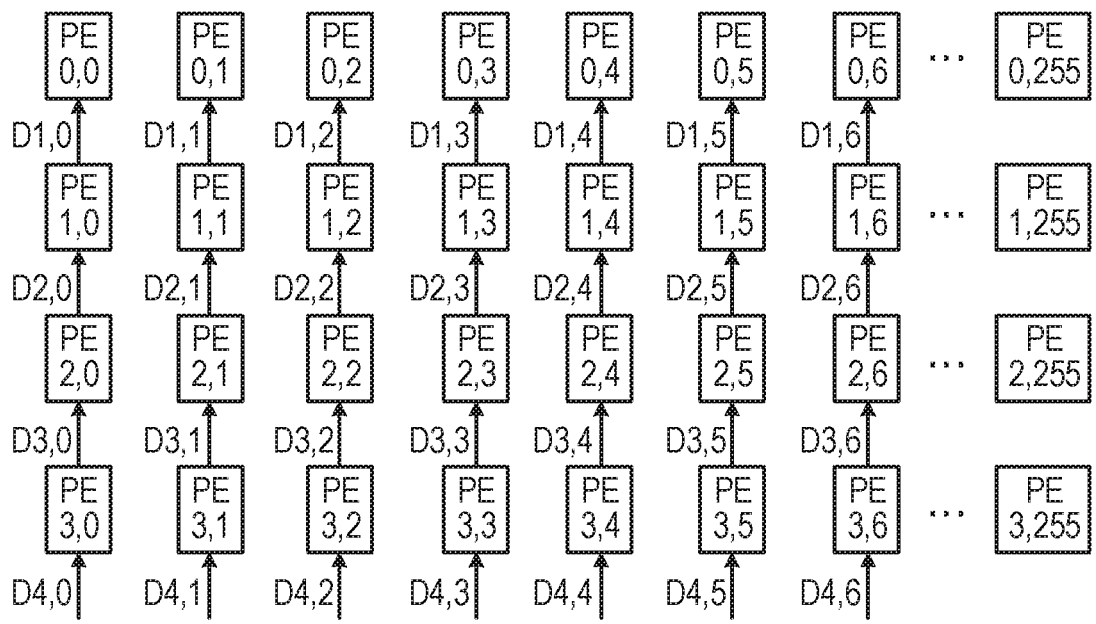
FIG. 6D demonstrates multiplying data elements stored in PEs of the systolic array by weight W1,0, helpful in demonstrating embodiments of the invention.

FIG. 6D demonstrates multiplying data elements stored in PEs 110 of horizontal group 750 by weight W1,0. In this cycle, the data is shifted upwards so PE0,0 operates on D1,0 of each IM, e.g., from shadow register 420 of a row underneath. It is noted that while in FIGS. 6B and 6C data in the active registers is shifted horizontally, data in the shadow registers remains the same. The PSUM register 480 in PE0,0 accumulates its previous result with the multiplication of D1,0*W1,0. Thus, after this cycle, PSUM register 480 stores the result of the first four multiplications of the filter:

$$PSUM = \sum_{n \in IM\ layer} D_n 0,0 * W0,0 + \sum_{n \in IM\ layer} D_n 0, 1 * W0, 1 + \sum_{n \in IM\ layer} D_n 0, 2 * W0, 2 + \sum_{n \in IM\ layer} D_n 1, 0 * W1, 0$$

Figure 6E:
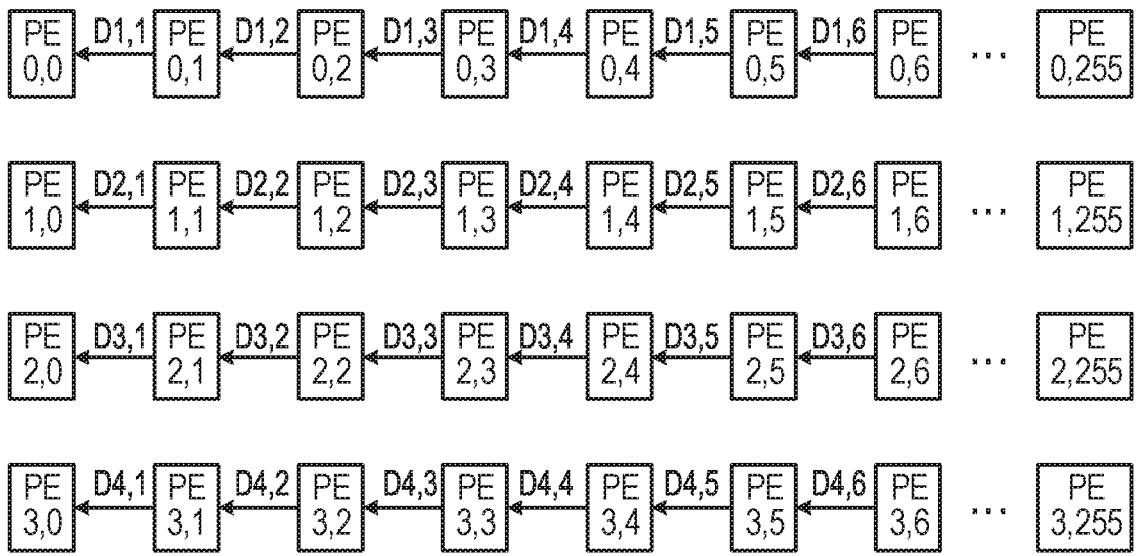
FIG. 6E demonstrates multiplying data elements stored in PEs of the systolic array by weight W1,1, helpful in demonstrating embodiments of the invention.

FIG. 6E demonstrates multiplying data elements stored in PEs 110 of horizontal group 750 by weight W1,1. In this cycle, the data is shifted left so PE0,0 operates on D1,1 of each IM. The PSUM register 480 in PE0,0 accumulates its previous result with the multiplication of D1,1*W1,1. Thus, after this cycle, PSUM register 480 stores the result of the first five multiplications of the filter:

$$PSUM = \sum_{n \in IM\ layer} D_n 0,0 * W0,0 + \sum_{n \in IM\ layer} D_n 0, 1 * W0, 1 + \sum_{n \in IM\ layer} D_n 0, 2 * W0, 2 + \sum_{n \in IM\ layer} D_n 1, 0 * W1, 0 + \sum_{n \in IM\ layer} D_n 1, 1 * W1, 1$$

Figure 6F:
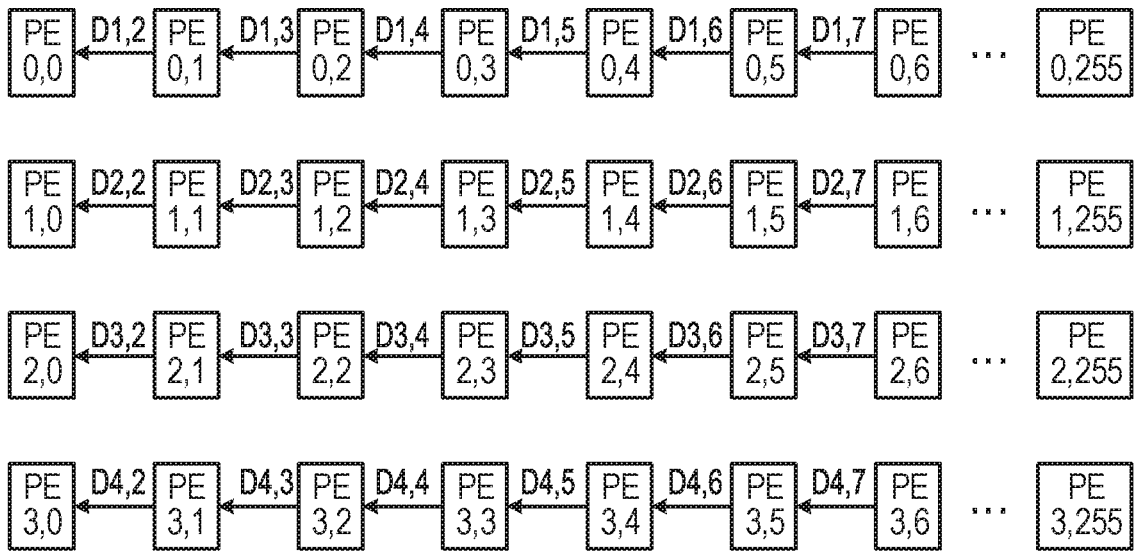
FIG. 6F demonstrates multiplying data elements stored in PEs of the systolic array by weight W1,2, helpful in demonstrating embodiments of the invention.

FIG. 6F demonstrates multiplying data elements stored in PEs 110 of horizontal group 750 by weight W1,2. In this cycle, the data is shifted left so PE0,0 operates on D1,2 of each IM. The PSUM register 480 in PE0,0 accumulates its previous result with the multiplication of D1,2*W1,2. Thus, after this cycle. PSUM register 480 stores the result of the first six multiplications of the filter:

$$PSUM = \sum_{n \in IM\ layer} D_n 0,0 * W0,0 + \sum_{n \in IM\ layer} D_n 0, 1 * W0, 1 + \sum_{n \in IM\ layer} D_n 0, 2 * W0, 2 + \sum_{n \in IM\ layer} D_n 1, 0 * W1, 0 + \sum_{n \in IM\ layer} D_n 1, 1 * W1, 1 + \sum_{n \in IM\ layer} D_n 1, 2 * W1, 2$$

Figure 6G:
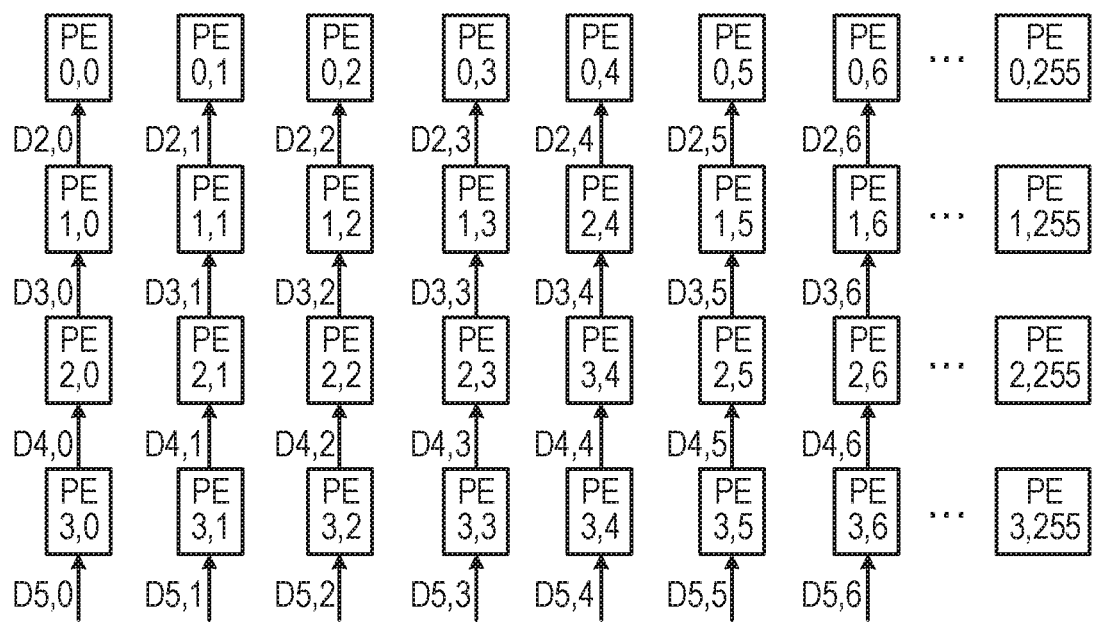
FIG. 6G demonstrates multiplying data elements stored in PEs of the systolic array by weight W2,0, helpful in demonstrating embodiments of the invention.

FIG. 6G demonstrates multiplying data elements stored in PEs 110 of horizontal group 750 by weight W2,0. In this cycle, the data is shifted upwards so PE0,0 operates on D2,0 of each IM. The PSUM register 480 in PE0,0 accumulates its previous result with the multiplication of D2,0*W2,0. Thus, after this cycle, PSUM register 480 stores the result of the first seven multiplications of the filter.

$$PSUM = \sum_{n \in IM\ layer} D_n 0,0 * W0,0 + \sum_{n \in IM\ layer} D_n 0, 1 * W0, 1 + \sum_{n \in IM\ layer} D_n 0, 2 * W0, 2 + \sum_{n \in IM\ layer} D_n 1, 0 * W1, 0 + \sum_{n \in IM\ layer} D_n 1, 1 * W1, 1 + \sum_{n \in IM\ layer} D_n 1, 2 * W1, 2 + \sum_{n \in IM\ layer} D_n 2, 0 * W2, 0 +$$

Figure 6H:
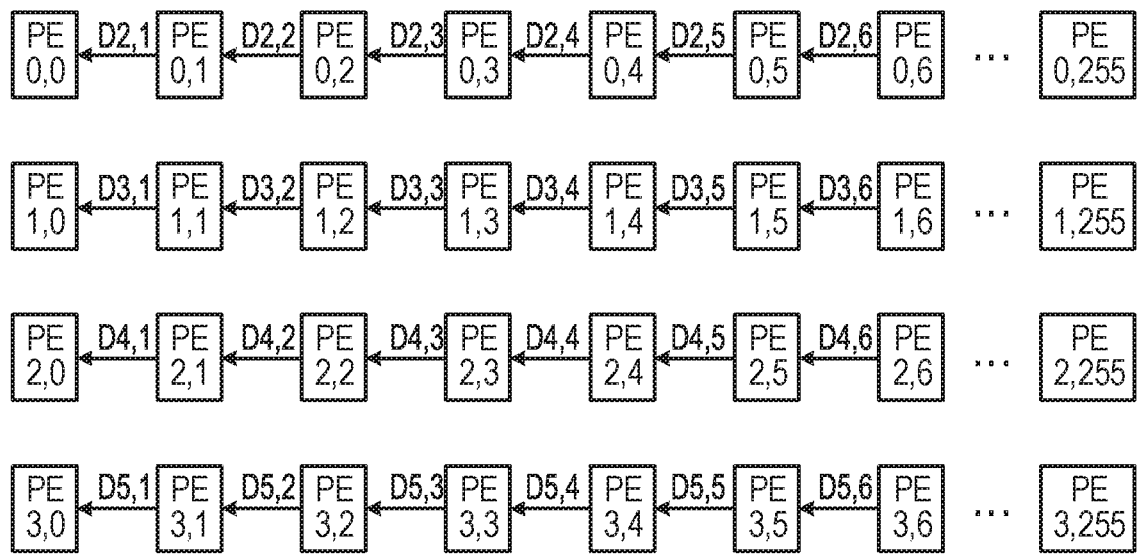
FIG. 6H demonstrates multiplying data elements stored in PEs of the systolic array by weight W2, 1, helpful in demonstrating embodiments of the invention.

FIG. 6H demonstrates multiplying data elements stored in PEs 110 of horizontal group 750 by weight W2,1. In this cycle, the data is shifted left so PE0,0 operates on D2,1 of each IM. The PSUM register 480 in PE0,0 accumulates its previous result with the multiplication of D2,1*W2,1. Thus, after this cycle, PSUM register 480 stores the result of the first eight multiplications of the filter:

$$PSUM = \sum_{n \in IM\ layer} D_n 0,0 * W0,0 + \sum_{n \in IM\ layer} D_n 0, 1 * W0, 1 + \sum_{n \in IM\ layer} D_n 0, 2 * W0, 2 + \sum_{n \in IM\ layer} D_n 1, 0 * W1, 0 + \sum_{n \in IM\ layer} D_n 1, 1 * W1, 1 + \sum_{n \in IM\ layer} D_n 1, 2 * W1, 2$$

-continued $$2 + \sum_{n \in IM \ layer} D_n 2, 0 * W2, 0 + \sum_{n \in IM \ layer} D_n 2, 1 * W2, 1$$

Figure 6I:
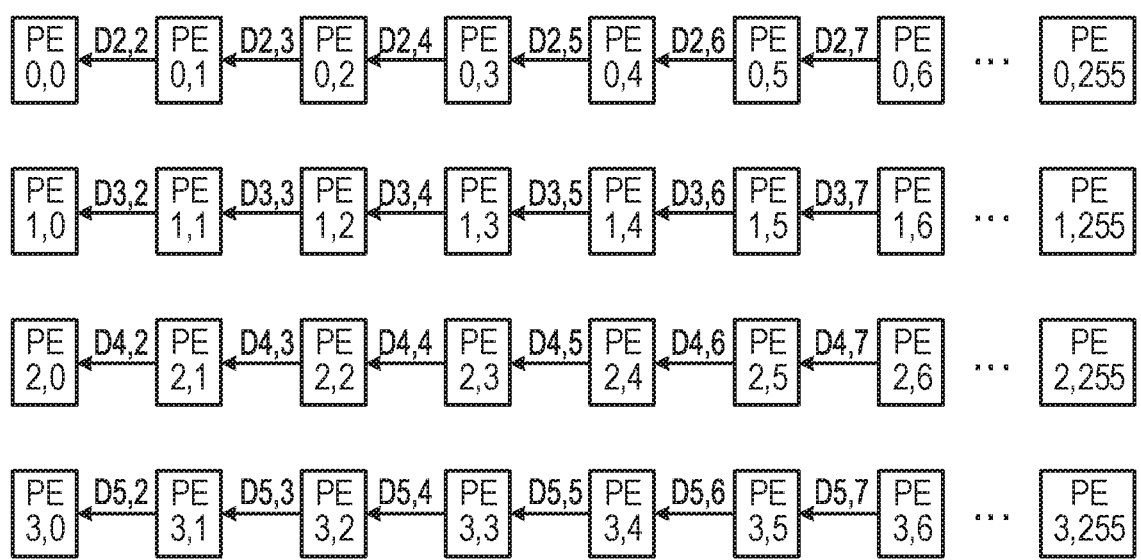
FIG. 6I demonstrates multiplying data elements stored in PEs of the systolic array by weight W2,2, helpful in demonstrating embodiments of the invention.

FIG. 6I demonstrates multiplying data elements stored in PEs 110 of horizontal group 750 by weight W2,2. In this cycle, the data is shifted left so PE0,0 operates on D2,2 of each IM. The PSUM 480 in PE0,0 accumulates its previous result with the multiplication of D2,2*W2,2. Thus, after this cycle, PSUM register 480 stores the result of all nine multiplications of the filter:

$$PSUM = \sum_{n \in IM \ layer} D_n 0, 0 * W0, 0 + \sum_{n \in IM \ layer} D_n 0, 1 * W0,$$
$$1 + \sum_{n \in IM \ layer} D_n 0, 2 * W0, 2 + \sum_{n \in IM \ layer} D_n 1, 0 * W1, 0 + \sum_{n \in IM \ layer} D_n 1,$$
$$1 * W1, 1 + \sum_{n \in IM \ layer} D_n 1, 2 * W1, 2 + \sum_{n \in IM \ layer} D_n 2, 0 * W2,$$
$$0 + \sum_{n \in IM \ layer} D_n 2, 1 * W2, 1 + \sum_{n \in IM \ layer} D_n 2, 2 * W2, 2$$

After performing all nine cycles of multiplying and accumulating, the 3×3 filter results are complete for all PEs 110 of horizontal group 750, where each PE 110 may either operate on a different spatial element in the same OM or operate on a different OM.

According to some embodiments, systolic array 100 may operate on a convolution layer with any number of IMs. For example, IMs may be split into sets of IMs, where a plurality of IMs in a set may be processed simultaneously using the fused MACs 120. For example, a set of 16 IMs may be processed in parallel, each IM by one MAC 120 within the PEs 110. A respective weight may be applied to each MAC 120 in a single PE 110 in the set. Thus, for a set of 16 IMs, the processing completes in 1/16th the number of cycles as compared to an architecture that operates on a single IM using a single MAC per PE. After processing a first set of IMs (e.g., IMs0 . . . 15), the next set of IMs (IMs 16 . . . 31) may be processed, and so on until all the IMs for a given layer are processed.

Figure 7:
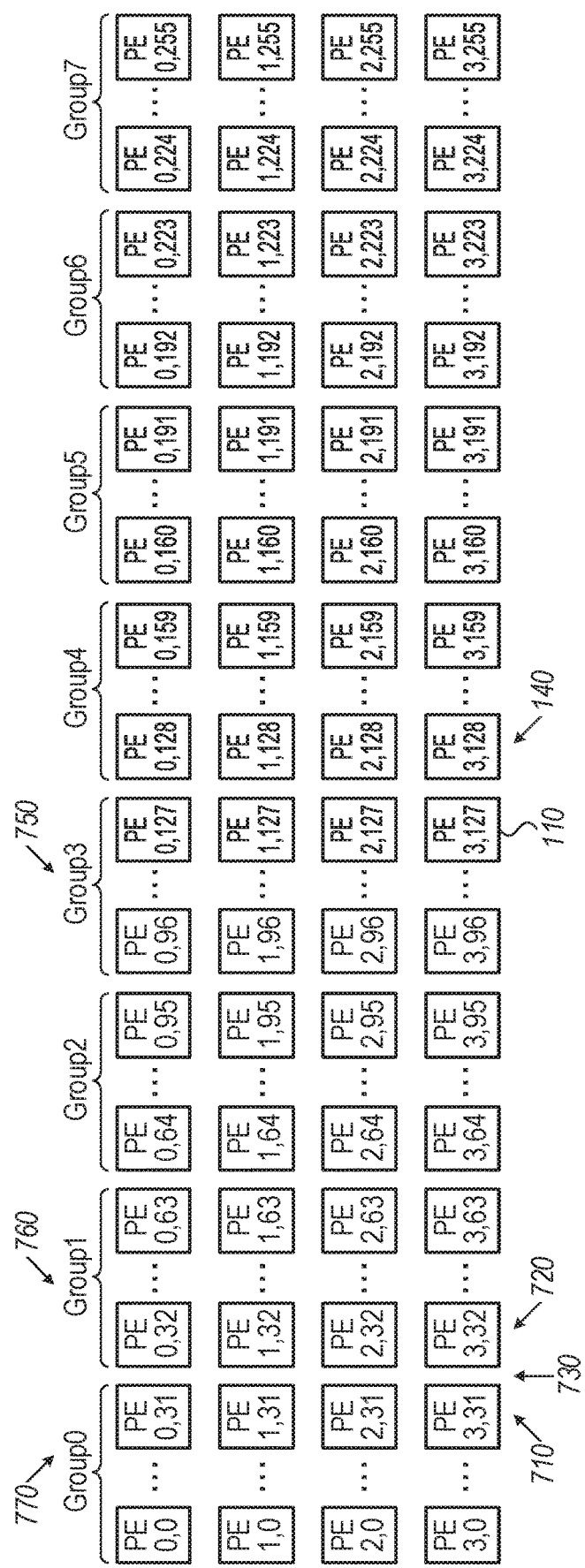
FIG. 7 demonstrates a division of a systolic array into eight horizontal groups with width of 32 PE columns, according to embodiments of the invention.

According to some embodiments, systolic array 100 may be horizontally divided or separated into multiple horizontal groups. Reference is now made to FIG. 7 which demonstrates a division of systolic array 100 into horizontal groups 750, according to embodiments of the invention. In the Example of FIG. 7, systolic array 100 is divided or separated into eight horizontal groups 750 with width of 32 PE columns 140. Each horizontal group 750 may have a group width defining the number of PEs 110 in each row 150 of horizontal group 750. For example, in a systolic array 100 of width peX=256, if the width of all horizontal groups 750 is eight, then systolic array 100 may include 32 horizontal groups 750 and may process up to 32 OMs simultaneously, each horizontal group 750 processing a separate OM, and if the width of all horizontal groups 750 is 32, then systolic array 100 may include 8 horizontal groups 750 and may process up to 8 OMs simultaneously. Other specific dimensions of data elements, and other numbers of OMs processed, may be used.

According to embodiments of the invention, a configurable or controllable data edge indication and a column valid indication may be associated with each column 140 in systolic array 100. Data edge indications and column valid indications may be controlled by controller 210 presented in FIG. 1. According to some embodiments, each indication may include a dedicated bit, e.g., each column 140 of PEs 110 may have an associated DataEdge bit and ColumnValid bit. Embodiments of the invention will be explained using DataEdge bit and ColumnValid bit. However, other indications may be used. In some embodiments, a first value of the ColumnValid bit (or indication) e.g., a logical '1' may indicate that the data in the column is valid or enabled and a second value of the ColumnValid bit (or indication) e.g., a logical '0' may indicate that the data in the column is not valid or disabled. Other indications or values may be used. A value of an enable signal 212 (presented in FIGS. 2-3) for each column 140 may be calculated or determined based on the value of the column valid indication, e.g., by controller 210. Thus, each column 140 may be enabled or disabled based on values of the associated column valid indication using the enable signal 212. Data elements stored in PEs 110 of an enabled column 140 may be referred to herein as valid data elements, and data elements stored in PEs 110 of a disabled column 140 may be referred to herein as invalid data elements.

Thus, according to embodiments of the invention, a column 140 of PEs 110 may be controllably enabled or disabled, and data stored therein may be validated or invalidated, by e.g., enabling or disabling a clock signal using the enable signal. For example, a column 140 of PEs 110 may be enabled or disabled according to the value of the ColumnValid bit (or indication). Disabling columns 140 that are not used in a specific cycle may improve the efficiency of systolic array 100 by reducing the power consumption of systolic array 100, by isolating inactive logic and disabling clocks of the multiplications, accumulators, and PSUMs 480 in a column 140 of PEs 110, and by enabling efficient utilization of PEs 110 as disclosed herein.

In some embodiments, a total of peX ColumnValid bits, a single ColumnValid bit for each column 140, may be programmed or set, e.g., by controller 210, when loading new IMs into systolic array 100, and may be updated when switching to a next filter row (e.g., by asserting the swap signal 450) or when shifting left (e.g., by asserting the shift-left signal). In some embodiments, the ColumnValid bits (or indications) may be set according to a value of the respective DataEdge bits (or indications) as disclosed herein. Thus, the value of the ColumnValid bit of a column 140 may be determined or calculated based on the values of the DataEdge bit of the same column 140 (or an adjacent column), and may indicate whether column 140 is valid or enabled, (e.g. the clock signal to these PEs 110 is not blocked or disabled and data in PEs 110 of that column should be used for calculations at a specific cycle) or whether column 140 is nulled, invalid or disabled (e.g., the clock signal to these PEs 110 is blocked or disabled, and data in PEs 110 of that column 140 should not be used for calculations at a specific cycle).

As disclosed herein, systolic array 100 may be horizontally divided into multiple horizontal groups 750. During filtering, data may be shifted left between neighboring PEs 110. Data that crosses or moves from one horizontal group, e.g., a right-side horizontal group 760, into an adjacent horizontal group, e.g., left-side horizontal group 770, for example, data that is shifted from column 720 of right-side horizontal group 760 (group 1) in FIG. 7 to column 710, may be considered to have crossed or moved across a group edge 730. Because data that belongs to a particular horizontal group 750 must not affect any other horizontal groups, data that crosses a group edge 730 must be nulled, disabled, or invalidated to ensure that it does not contribute to a neighboring group's computation. According to embodiments of the invention, valid data that crosses from a right-side horizontal group to 760 a left-side horizontal group 770 may be nulled, disabled, or invalidated, e.g., valid data that is shifted into a horizontal group from the leftmost column of the horizontal group to the right of it (for example, from column 720 to column 710), may be nulled, disabled, or invalidated, and data that is shifted out of a group from the leftmost column of the group may be discarded. Data may be nulled, disabled, or invalidated by disabling the column of PEs the data is shifted in to, e.g., by the enable signal.

The DataEdge bits (or indications) may be determined, set or programmed when loading new IMs according to the width of horizontal groups 750. There may be a total of peX DataEdge bits that indicate the horizontal position of the edges 730. For example, the value of DataEdge bits of columns that are not the rightmost column of a horizontal group 750 may equal a first value, e.g., logical '0' and the value of DataEdge bits of the rightmost column of each horizontal group 750 (e.g., column 710) may equal a second value, e.g., logical '1'. Other indications or values may be used.

When data crosses an edge (e.g., when shifting left), the data that crosses an edge may be nulled, invalidated or disabled (e.g., the PE the data is shifted to may be disabled) based on the value of associated DataEdge bit (or indication) and associated ColumnValid bit (or indication). In some embodiments, the value of the ColumnValid bit (or indication) of a column 140 after shifting left may be determined based on an operation, e.g., a logical operation, between associated DataEdge bits (or indications) and associated ColumnValid bits (or indications). For example, the data may be invalidated by XORing the ColumnValid bit of the column that is being shifted with the DataEdge bit of the column data is being shifted to. Since the value of DataEdge bits of rightmost column of each horizontal group 750 (e.g., column 710) may equal logical '1', XORing the ColumnValid bit with the DataEdge bit at the rightmost column may invert the value of the ColumnValid bit, thus indicating that the column is not valid. Since the value of DataEdge bits of the other columns 140 of each horizontal group 750 (e.g., all but the rightmost column) may equal logical '0', the value of ColumnValid bit of these rows may remain the same after being XORed with the DataEdge bit, thus indicating that these columns are valid. Other indications and logic may be used.

Figure 8:
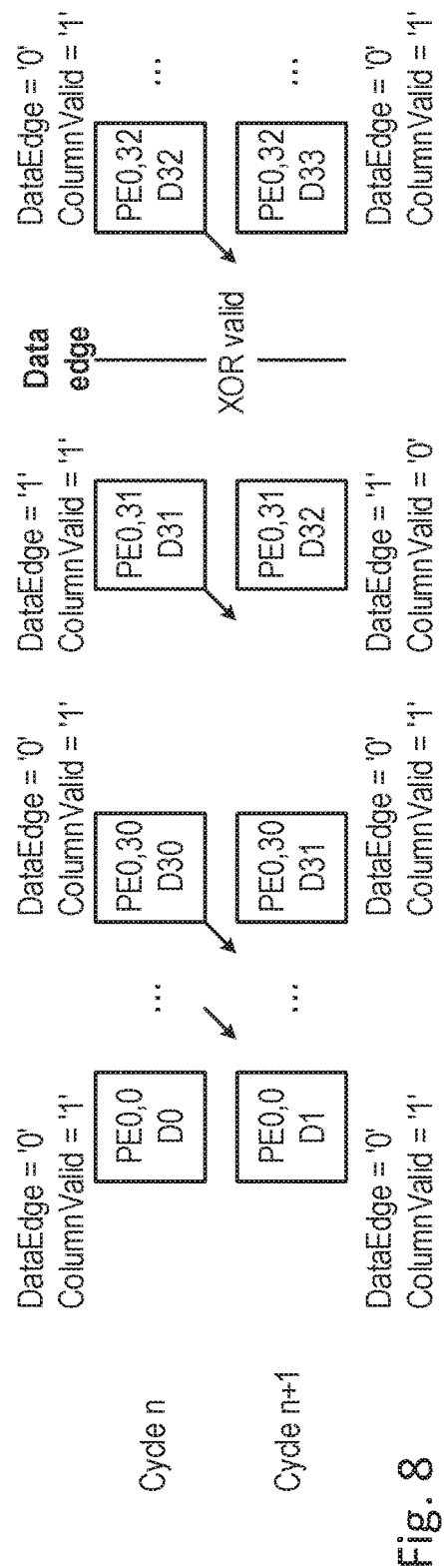
FIG. 8 is an example of column invalidation when crossing an edge, according to embodiments of the invention.

Reference is now made to FIG. 8 which is an example of column invalidation when crossing an edge, according to embodiments of the invention. In cycle n the value of the ColumnValid bit of all the columns equals logical '1', which indicates that the data in all the columns is valid and may be used for calculations. Since there is a data edge between PE0,31 and PE0,32, the value of the DataEdge bit of the column of PE0,31 equals logical '1'. The value of the DataEdge bit of the other columns in FIG. 8 equals logical '0'. When data is shifted left, as can be seen in cycle n+1, the ColumnValid bit of the data that is being shifted is XORed with the DataEdge bit of the column it is shifted to. Thus, the value of the ColumnValid bit of the data that crosses the edge is inverted to logical '0', indicating that the data is not valid and should not be used for calculations, while the value of other ColumnValid bits remains the same.

As known, a convolutional layer may have pad or space-filling values (e.g., array elements that equal zero) as defined by the system. For example, for a three-tap filter, a single column of pads may be required to the right of each IM and another column of pads may be required to the left of each IM. Thus, some of the PEs 110 of systolic array 100 may be used for storing dummy data elements (e.g., the pads) instead of real data elements, leading to poor utilization of systolic array 100. The terms left and right may be used herein for simplicity to indicate two opposite directions relatively to the location of data in systolic array 100, where an LSB may be located at a right side of an IM an MSB may be located at a left side. Other relative directions may be used for such an indication; "left" and "right" is used for convenience elsewhere in this application, and other such indications may be used.

According to embodiments of the invention, at least some padding may be avoided and PEs 110 that where meant to store pads may store valid data, thus increasing the utilization of systolic array 100 and improving its efficiency. For example, IM row data may be loaded into systolic array 100 without introducing zeros where there should be pads. Instead, the loaded data is cyclically rotated or shifted to the right before being written to systolic array 100 according to the required number of pads. In some embodiments loaded IM data may be shifted by a single PE for each of the required pads at the left side (which is typically half of the total number of horizontal pads). For example, if a single pad is required at the left side, loaded IM data may be cyclically rotated or shifted to the right by a single PE, or in the general case, if p pads are required at the left side, IM data may be cyclically rotated or shifted to the right by p PEs, where p is an integer that is equal or larger than one. As known, for a horizontal filter of k taps, where k is an odd number, p may equal $$\frac{k-1}{2}.$$

According to embodiments of the invention, when data is loaded and shifted to the right as disclosed herein, a portion of the IM row data may be loaded to a left-side horizontal group and other portion of the IM row data may be loaded to a right-side horizontal group, and the portion of the IM row data that is loaded to the right-side horizontal group may be nulled, invalidated or disabled.

Figure 9:
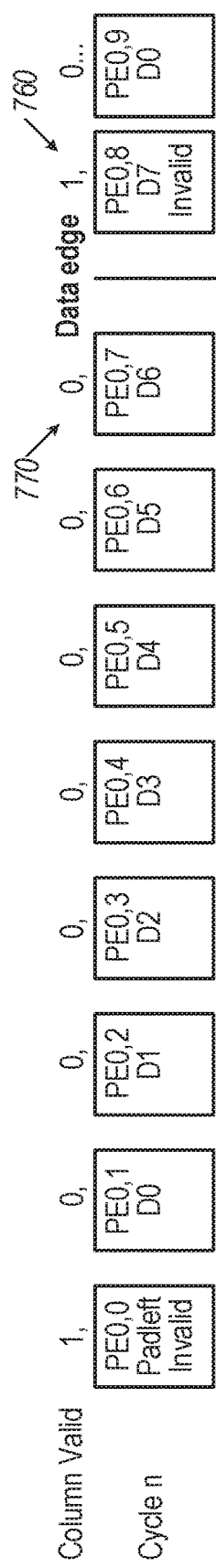
FIG. 9 demonstrates loaded IM data for a three-tap filter in cycle n, according to embodiments of the invention.

Reference is now made to FIG. 9, which demonstrates loaded IM data for a three-tap filter in cycle n (a first cycle of the filter), according to embodiments of the invention. In this example, the horizontal group width equals eight, and a single pad is required at each side of the IM row D0-D7. Thus, in accordance with embodiments of the invention, IM row D0-D7 is shifted to the right by a single PE (right shift by one). According to prior art the group width should be programmed to equal 10, IM row D0-D7 should be loaded into PE0,1 through PE0,8, and pads should be inserted at PE0,0 and PE0,9. According to some embodiments of the invention, however, no pads are used. Instead, IM row D0-D7 is loaded into PE0,1 through PE0,8, (rather than to PE0,0 through PE0,7 due to the right shift by one) at left-side horizontal group 770, and PE0,8 of right-side horizontal group 770, as well as PE0,0 are invalidated. For example, PE0,0 and PE0.8 may be invalidated by initializing the ColumnValid bits of PE0,0 and PE0.8 to logical '0', indicating that these PEs are not valid and should not be used for calculations. The ColumnValid bits of PE0,1 to PE0,7 may be initialized to logical '1' indicating that these PEs are valid. Other indications or bit values may be used to indicate valid or invalid PEs.

Figure 10:
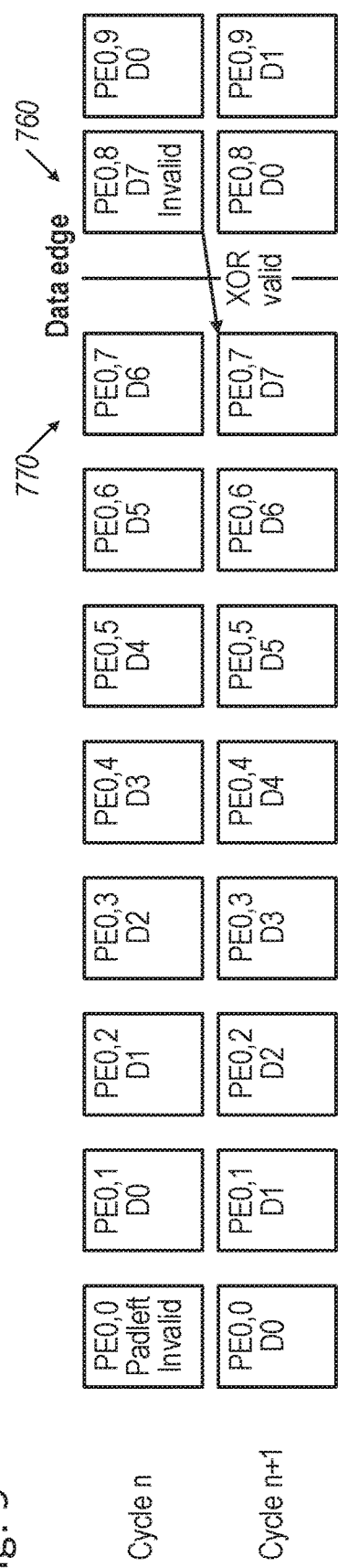
FIG. 10 demonstrates IM data for a three-tap filter in cycle n+1, according to embodiments of the invention.

Reference is now made to FIG. 10, which demonstrates IM data for a three-tap filter in cycle n+1 (a second cycle of the filter), according to embodiments of the invention. In cycle n+1, data may be shifted by a single PE to the left as shown in FIG. 10. After a single shift left, the data that remains within left-side horizontal group 770, e.g., D0-D6 now stored in PE0,0 through PE0,6, is valid, while the ColumnValid bit of D7 (the data that crossed an edge and is now stored in PE0,7) is inverted. Thus, in cycle n+1 all the IM row data D0 . . . D7 are valid.

Figure 11:
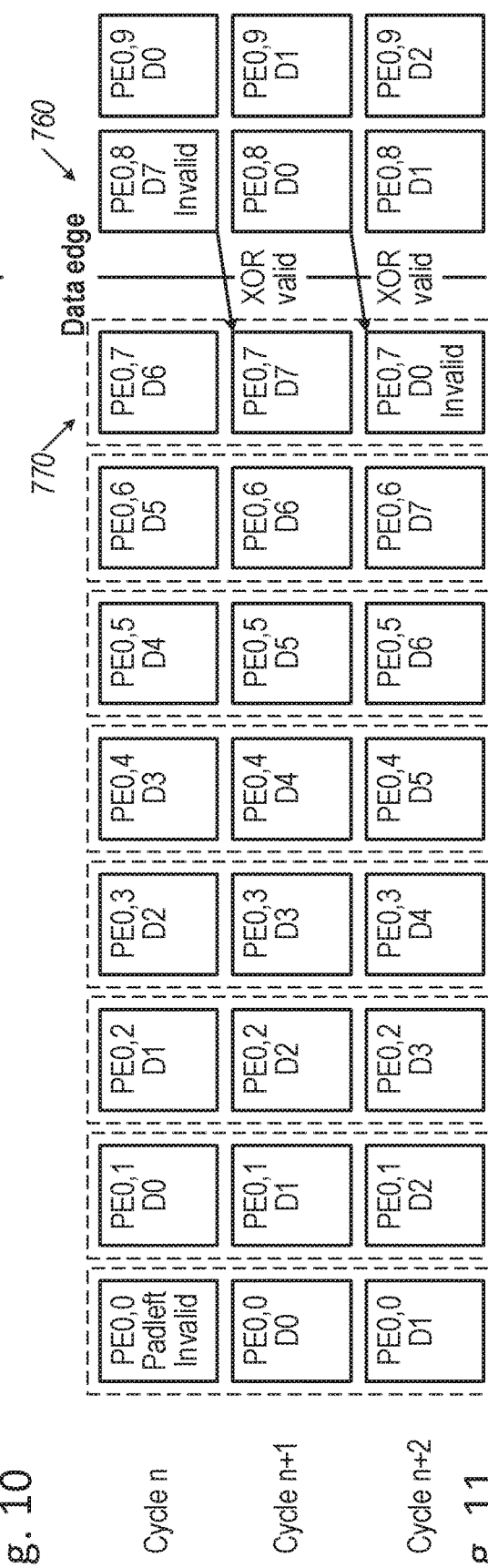
FIG. 11 demonstrates IM data for a three-tap filter in cycle n+2, according to embodiments of the invention.

Reference is now made to FIG. 11, which demonstrates IM data for a three-tap filter in cycle n+2 (a third cycle of the filter), according to embodiments of the invention. In cycle n+2, data may be further shifted by a single PE to the left as shown in FIG. 11. Data D0 of a next IM row that was stored in cycle n+1 in PE0,8 now crosses the edge and is moved into left-side horizontal group 770. However, since the ColumnValid bit of this data element was initialized to logical '1' this value will be inverted to logical '0' when crossing the edge, as a result of XOR operation with the DataEdge bit. Thus, at cycle n+2 data D0 of a next IM row becomes invalid and does not contribute to the calculation in PE0,7.

For a filter with three horizontal taps, all the filter results may be ready after cycle n+2. The results in this example are the horizontal filter outputs for the first group in the array:

The result in PE0,0 accumulated the multiplication based on data D0 and D1.

The results in PE0, 1 through PE0,6 each accumulated three multiplications.

The results in PE0,7 accumulated the multiplication based on data D6 and D7.

Figure 12:
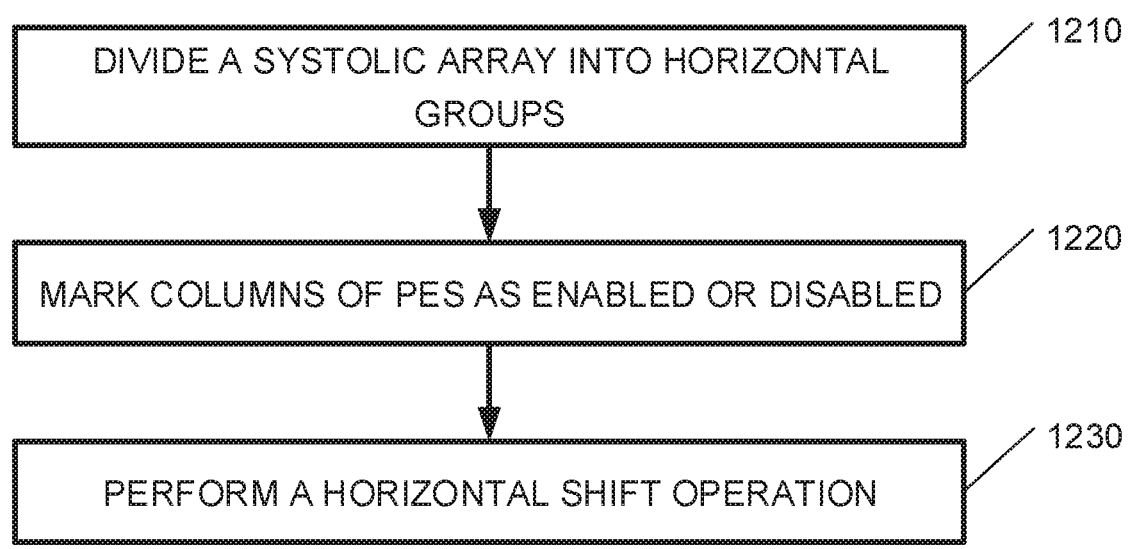
FIG. 12 is a flowchart diagram illustrating a method for or performing computational processing in a systolic array of PEs according to embodiments of the present invention.

Reference is made to FIG. 12, which is a flowchart diagram illustrating a method for performing computational processing in a systolic array of PEs, according to embodiments of the invention. An embodiment of a method for performing computational processing in a systolic array of PEs may be performed, for example, by computer system 200 presented in FIG. 2, but other hardware that includes a systolic array (e.g. systolic array 100) may be used.

In operation 1210 a systolic array, e.g., systolic array 100, may be divided or separated into a plurality of horizontal groups. The width of the horizontal groups' may be defined by the number of PEs in each row of the horizontal group. In operation 1220, columns of PEs may be marked as enabled (e.g., storing valid data) or disabled (e.g., storing invalid data). For example, a column valid indication, suggesting whether a column stores valid or invalid data may be associated with each column, and controlled by a controller (e.g., controller 210). In operation 1230, a horizontal shift operation may be performed across the entire systolic array. The horizontal shift operation may include invalidating valid data that crosses from a first column of PEs of a first horizontal group to a second column of PEs of a second horizontal group, where the first horizontal group is adjacent to the second horizontal group. The horizontal shift operation may include validating invalid data that crosses from the first horizontal group to the second horizontal group. In some embodiments validating the invalid data may include enabling the PEs the data is shifted to, and invalidating the valid data may include disabling the PEs the data is shifted to. In some embodiments, validating and invalidating data may be achieved using the data edge indication and the column valid indication, as disclosed herein.

Figure 13:
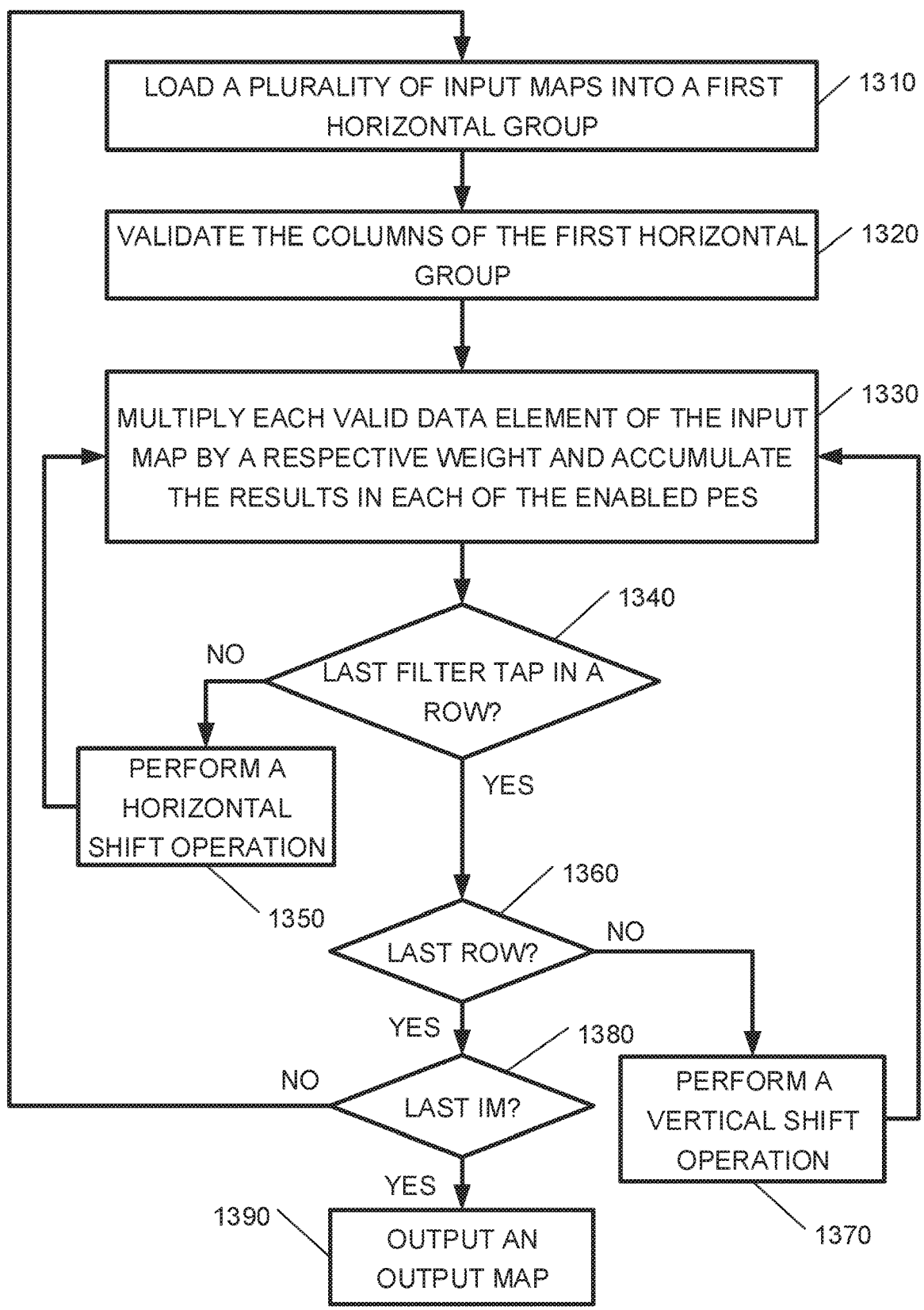
FIG. 13 is a flowchart diagram illustrating a method for performing a two-dimensional filter in a systolic array of PEs, according to embodiments of the invention.

Reference is made to FIG. 13, which is a flowchart diagram illustrating a method for performing a two-dimensional filter in a systolic array of PEs, according to embodiments of the invention. An embodiment of a method for performing a two-dimensional filter in a systolic array of PEs may be performed, for example, by computer system 200 presented in FIG. 2, but other hardware that includes an array, e.g. systolic array 100, may be used. The filter may be two-dimensional, e.g., the filter may include filter taps or filter weights arranged in a plurality of rows and a plurality of columns. While the method for performing a two-dimensional filter in a systolic array of PEs may be explained herein with relation to a single filter in a single horizontal group, similar operations may performed in other, or in all the horizontal groups of systolic array 100, only using different weights and different data items.

In operation 1310 a plurality of input maps may be loaded into a first horizontal group, wherein a respective data element of the input maps may be loaded into an active register and a shadow register of a single PE. As disclosed herein, a single PE, e.g., PE 110 may include active registers, e.g., active registers 410, and shadow registers, e.g., shadow registers 420 for accommodating the data elements. The input maps may be loaded row by row through the bottom row (e.g., bottom row 130) of the systolic array (e.g., systolic array 100). In each loading cycle, a new row of each of the input maps may be loaded to the bottom row, and the rows that were loaded in previous load cycles may be shifted upwards in the systolic array, as disclosed herein.

In operation 1320, the columns of the first horizontal group may be validated. The columns of the first horizontal group may be validated using a controllable column valid indication or bit associated with the columns, for enabling and disabling the columns, as disclosed herein. The value of the column valid indication or bit may be controlled, in some embodiments, by controller 210 that may set or program the values of column valid indication or bit. In some embodiments, DataEdge bits or indications may be set or programmed according to the width of the horizontal groups to mark group edges as disclosed herein, e.g., by controller 210.

In operation 1330, each valid data element of each input map may be multiplied by a respective weight and the results may be accumulated in each of the enabled PEs. For example, the results may be accumulated in a register (e.g., PSUM register 480 shown in FIG. 4). In some embodiments, a single weight may be applied to all the PEs of the first horizontal group. Thus, all the data elements may be multiplied by the same weight or filter tap.

If the filter tap is not the last filter tap in a row of the filter, as verified in decision block 1340, then in operation 1350 a horizontal shift operation may be performed on the data, e.g., by loading to each active register of each PE, data from a respective active register of a PE in the same row at an adjacent column. When performing a horizontal shift operation, data from a first column of PEs of a horizontal group that is adjacent to the first horizontal group, e.g., data items of a neighboring horizontal group, may cross the group edge to the first horizontal group. Data items that cross from neighboring horizontal groups may not be part of the filtering operation taking place in the first horizontal group and should not influence the filtering results. Thus, these data items in some embodiments should be invalidated. As disclosed herein, when performing a horizontal shift operation, valid data that crosses from a horizontal group that is adjacent to the first horizontal group to the first horizontal group may be nulled, disabled, or invalidated. Invalidating may be achieved using a logic operation involving the DataEdge bits or indications and the ColumnValid bits (or indications), as disclosed herein. The DataEdge bits or indications and the ColumnValid bits or indications may be set or programmed by a controller, e.g., controller 210.

The multiplication operation of block 1330 and the horizontal shift operation of block 1350 may be repeated for all the filter taps in a row of a filter. If the filter tap is the last filter tap in a row of the filter, as verified in decision block 1340, then if the filter row is not the last row of the filter, as verified in decision block 1360, then a vertical shift operation may be performed on the data, and operations 1330, 1340 and 1350 may be repeated for the remaining rows of the filter. For example, the vertical shift operation may be performed by loading to each active register of each PE data from a respective shadow register of PEs in the same column at a row underneath, as indicated in operation 1370. After a vertical shift is performed in operation 1370, then operations 1330, 1340, 1350 and 1360 may be repeated for all the filter taps in the new filter row.

If the filter row is the last row of the filter, as verified in decision block 1360, then the filtering operation for the group of IMs has ended. According to embodiments of the invention, each PE in the systolic array may include a plurality, e.g., 16, MACs. Therefore, a horizontal group may process up to 16 IMs in parallel. However, many filter or convolution application related to neural network applications require processing of more than 16 IMs for generating a single OM. Therefore, after processing the last row, if more IMs need to be processed for generating the OM, as verified in operation 1380, the method may move to back operation 1310 and a next group of IMs may be loaded. After the last IM is processed the results of the filter, e.g., the OM, may be output from the systolic array, as indicated in operation 1390. For example, the OM may be output row by row through the bottom row (e.g., bottom row 130) of the systolic array (e.g., systolic array 100), wherein in each output cycle a row of the OM may be output through the bottom row, and the rows above it may be shifted downwards towards the bottom row in the systolic array, as disclosed herein.

Figure 14:
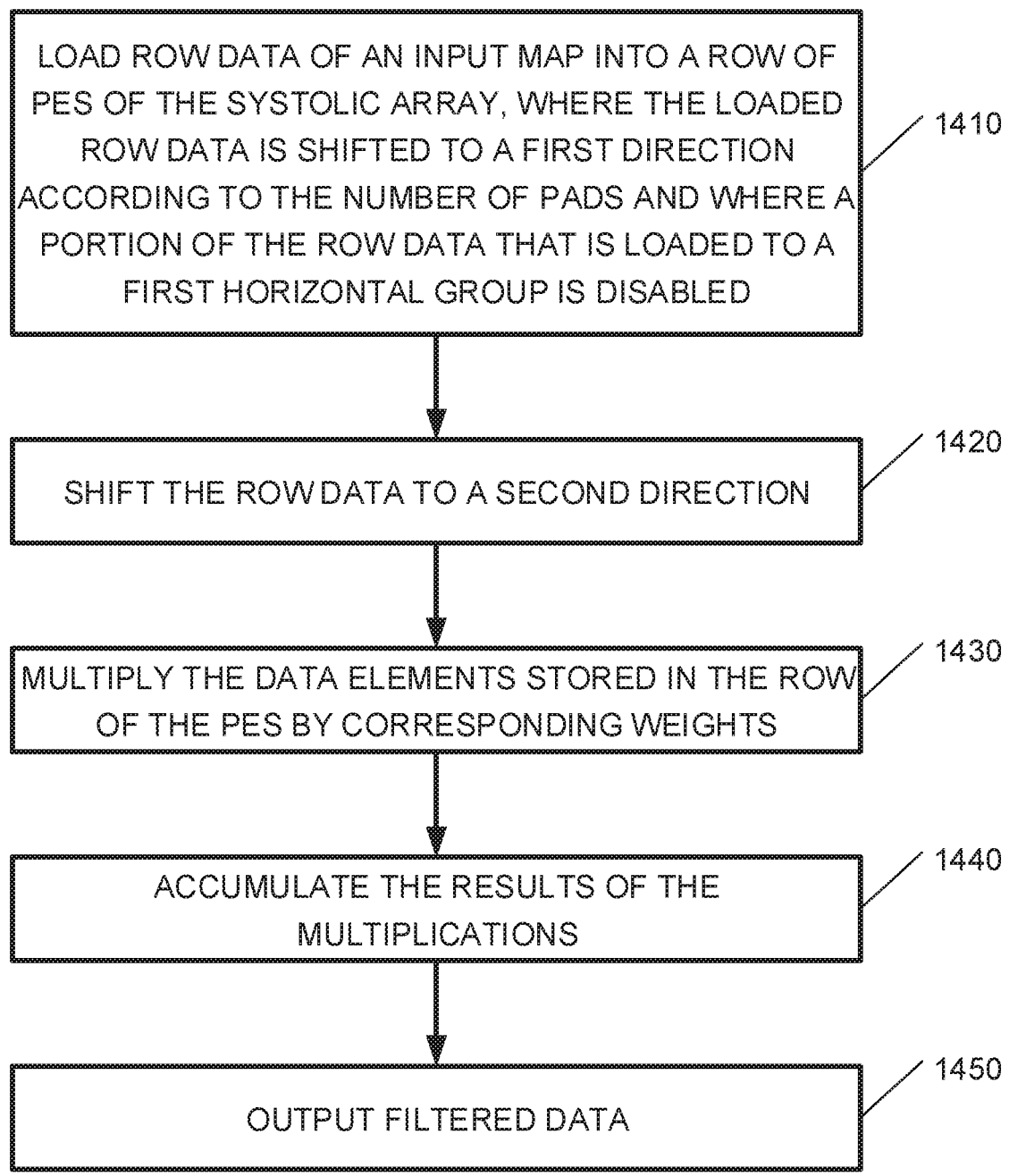
FIG. 14 is a flowchart diagram illustrating a method for performing a filter with pads in a systolic array of PEs, according to embodiments of the invention.

Reference is made to FIG. 14, which is a flowchart diagram illustrating a method for performing a filter with pads in a systolic array of PEs, according to embodiments of the invention. An embodiment of a method for performing a filter with pads in a systolic array of PEs may be performed, for example, by computer system 200 presented in FIG. 2, but other hardware that includes an array, e.g. systolic array 100, may be used.

In operation 1410, a row of data elements (or a plurality or rows of data elements) may be loaded into a row of PEs of the systolic array. As mentioned herein, a plurality of data elements may be loaded to each PE in a row. The data elements may be loaded through the bottom row (e.g., bottom row 130) of the systolic array (e.g., systolic array 100). In each loading cycle, a new row of data elements or a plurality or rows of data elements, may be loaded to the bottom row and the rows that were loaded in previous load cycles may be shifted upwards in the systolic array, as disclosed herein. The loaded row data may be shifted in a first direction, e.g., shifted to the right, according to the number of pads in the filter, so that a first portion of the row data is loaded to a first horizontal group and a second portion of the row data is loaded to a second horizontal group. The portion of the row data that is loaded to the first horizontal group may be invalidated. For example, the portion of the row data that is loaded to the first horizontal group may be invalidated using the ColumnValid bit (or indication), as disclosed herein. In some embodiments, DataEdge bits or indications may be set or programmed according to the width of the horizontal groups to mark group edges as disclosed herein, e.g., by controller 210.

As indicated in operation 1420, the row data may be horizontally shifted in a second direction, e.g., shifted left. When performing the shift left operation (operation 1420), disabled, nulled or invalidated data that crosses from the first horizontal group to the second horizontal group may be enabled, or validated, as disclosed herein (e.g., in FIG. 10). Similarly, enabled, or validated data that crosses from the first horizontal group to the second horizontal group may be disabled, nulled or invalidated, as disclosed herein (e.g., in FIG. 11). For example, invalidated data that crosses from the first horizontal group to the second horizontal group may be validated using a logic operation involving the DataEdge bits or indications and the ColumnValid bits (or indications), as disclosed herein, similarly, validated data that crosses from the first horizontal group to the second horizontal group may be invalidated using a logic operation involving the DataEdge bits or indications and the ColumnValid bits (or indications), as disclosed herein. The DataEdge bits or indications and the ColumnValid bits or indications may be set or programmed by a controller, e.g., controller 210.

As indicated in operation 1430, the data elements stored in the row of the PEs may be multiplied by corresponding weights. Operations 1420 and 1430 may be repeated for all filter taps. As indicated in operation 1440. The results of the multiplications may be accumulated, e.g., in a PSUM register. After the filter operation has ended, the filtered data may be output from the systolic array, e.g., through the bottom row, as disclosed herein.

Embodiments of the invention may be implemented for example on an integrated circuit (IC), for example, by constructing systolic array 100, as well as other components of FIGS. 1-4 in an integrated chip or as a part of a chip, such as an ASIC, an FPGA, a CPU, a DSP, a microprocessor, a controller, a microchip, etc.

According to embodiments of the present invention, some units e.g., systolic array 100, as well as the other components of FIGS. 1-4, may be implemented in a hardware description language (HDL) design, written in Very High Speed Integrated Circuit (VHSIC) hardware description language (VHDL), Verilog HDL, or any other hardware description language. The HDL design may be synthesized using any synthesis engine such as SYNOPSYS® Design Compiler 2000.05 (DC00), BUILDGATES® synthesis tool available from, Cadence Design Systems, Inc. An ASIC or other integrated circuit may be fabricated using the HDL design. The HDL design may be synthesized into a logic level representation, and then reduced to a physical device using compilation, layout and fabrication techniques, as known in the art.

Embodiments of the present invention may include a computer program application stored in non-volatile memory, non-transitory storage medium, or computer-readable storage medium (e.g., hard drive, flash memory, CD ROM, magnetic media, etc.), storing instructions that when executed by a processor (e.g., controller 210) carry out embodiments of the invention.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

The invention claimed is:

1. A systolic array for computational processing, the systolic array comprising:
   an array of processing elements (PEs) arranged in rows and columns;
   logic to perform a horizontal shift operation, wherein the horizontal shift operation is performed across the entire systolic array; and
   logic to mark columns of PEs as enabled or disabled, wherein the systolic array is horizontally divided into horizontal groups, and wherein when performing the horizontal shift operation, valid data that crosses from a first column of PEs of a first horizontal group to a second column of PEs of a second horizontal group is invalidated, wherein the first horizontal group is adjacent to the second horizontal group.

2. The systolic array of claim 1, wherein invalid data that crosses from the first horizontal group to the second horizontal group is validated.

3. The systolic array of claim 2, wherein data is validated by enabling the PEs the data is shifted to, and invalidated by, disabling the PEs the data is shifted to.

4. The systolic array of claim 2, wherein the systolic array is configured to perform a two-dimensional filter in the first horizontal group by:
   a. loading a plurality of input maps into the first horizontal group, wherein a respective data element of each input map is loaded into an active register and a shadow register of a single PE;
   b. validating the columns of the first horizontal group;
   c. multiplying each valid data element of each input map by a respective weight and accumulating the results in each of the enabled PEs;
   d. performing the horizontal shift operation by loading data from the active register of PEs at an adjacent column;
   e. repeating operations c and d for a row of filter taps;
   f. performing a vertical shift operation by loading data from the shadow register of PEs at a row underneath;
   g. repeating operations c-e; and
   h. repeating operation f and g for remaining rows of the filter.

5. The systolic array of claim 2, wherein the systolic array is configured to perform a filter with pads by:
   loading row data of an input map (IM) into a row of PEs of the systolic array, wherein the loaded row data is shifted in a first direction according to the number of pads so that a first portion of the row data is loaded to the first horizontal group and a second portion of the row data is loaded to the second horizontal group, wherein the portion of the row data that is loaded to the first horizontal group is invalidated;
   in each cycle of the filtering, horizontally shifting the row data to a second direction;
   multiplying the data elements stored in the row of the PEs by corresponding weights; and
   accumulating the results of the multiplications.

6. The systolic array of claim 2, comprising:
   controllable data edge indications associated with the columns, for indicating a horizontal position of edges between the horizontal groups; and
   controllable column valid indications associated with the columns, for enabling and disabling the columns,
   wherein disabling and enabling the data that crosses from the first horizontal group to the second horizontal group is performed according to a value of an associated column valid indication and associated data edge indication.

7. The systolic array of claim 6, wherein:
   the column valid indication comprises a ColumnValid bit, wherein a first value of the ColumnValid bit indicates that data in a respective column is valid, and a second value of the ColumnValid bit indicates that data in the respective column is not valid;
   the data edge indication comprises a DataEdge bit, wherein a first value of the DataEdge bit indicates an edge, and a second value of the DataEdge bit indicates no edge;
   and
   wherein value of the ColumnValid bit of a column after performing horizontal shift is determined based on a logical operation between associated DataEdge bit and ColumnValid bit.

8. The systolic array of claim 7, wherein the logical operation is an XOR operation between the associated ColumnValid bit and DataEdge bit.

9. The systolic array of claim 1, wherein each PE comprises at least one multiplier-accumulator (MAC).

10. The systolic array of claim 1, wherein the array of PEs is a two-dimensional array.

11. A method for performing computational processing in a systolic array of processing elements (PEs) that are arranged in rows and columns, the method comprising:
   dividing the systolic array into horizontal groups;
   marking columns of PEs as enabled or disabled; and
   performing a horizontal shift operation across the entire systolic array, wherein the horizontal shift operation comprises invalidating valid data that crosses from a first column of PEs of a first horizontal group to a second column of PEs of a second horizontal group, wherein the first horizontal group is adjacent to the second horizontal group,
   wherein each of the PEs includes at least one multiplier-accumulator (MAC).

12. The method of claim 11, comprising validating invalid data that crosses from the first horizontal group to the second horizontal group.

13. The method of claim 12, wherein validating the invalid data comprises enabling the PEs the data is shifted to, and wherein invalidating the valid data comprises disabling the PEs the data is shifted to.

14. The method of claim 12, comprising performing a two-dimensional filter in the first horizontal group of the systolic array by:
   a. loading a plurality of input maps into the first horizontal group, wherein a respective data element of each input map is loaded into an active register and a shadow register of a single PE;
   b. validating the columns of the first horizontal group;
   c. multiplying each valid data element of each input map by a respective weight and accumulating the results in each of the enabled PEs;
   d. performing the horizontal shift operation by loading data from the active register of PEs at an adjacent column;
   e. repeating operations c and d for a row of filter taps;
   f. performing a vertical shift operation by loading data from the shadow register of PEs at a row underneath;
   g. repeating operations c-e; and
   repeating operation f and g for remaining rows of the filter.

15. The method array of claim 12, comprising performing a filter with pads by:
- loading row data of an input map (IM) into a row of PEs of the systolic array, wherein the loaded row data is shifted in a first direction according to the number of pads so that a first portion of the row data is loaded to the first horizontal group and a second portion of the row data is loaded to the second horizontal group, wherein the portion of the row data that is loaded to the first horizontal group is disabled;
- in each cycle of the filtering, horizontally shifting the row data to a second direction;
- multiplying the data elements stored in the row of the PEs by corresponding weights; and
- accumulating the results of the multiplications.

16. The method of claim 12, comprising:
- indicating a horizontal position of edges between the horizontal groups by controllable data edge indications associated with the columns;
- enabling and disabling the columns by controllable column valid indications associated with the columns; and
- disabling and enabling the data that crosses from the first horizontal group to the second horizontal group according to a value of an associated column valid indication and associated data edge indication.

17. The method of claim 16, wherein:
- the column valid indication comprises a ColumnValid bit, wherein a first value of the ColumnValid bit indicates that data in a respective column is valid, and a second value of the ColumnValid bit indicates that data in the respective column is not valid;
- the data edge indication comprises a DataEdge bit, wherein a first value of the DataEdge bit indicates an edge, and a second value of the DataEdge bit indicates no edge;

and
- wherein value of the ColumnValid bit of a column after performing horizontal shift is determined based on a logical operation between associated DataEdge bit and ColumnValid bit.

18. The method of claim 17, wherein the logical operation is an XOR operation between the associated ColumnValid bit and DataEdge bit.

19. The method of claim 11, wherein each PE comprises at least one multiplier-accumulator (MAC).

20. The method array of claim 11, wherein the array of PEs is a two-dimensional array.

* * * * *